US008659205B2

(12) United States Patent
Moura et al.

(10) Patent No.: US 8,659,205 B2
(45) Date of Patent: Feb. 25, 2014

(54) MOTOR STATOR WITH LIFT CAPABILITY AND REDUCED COGGING CHARACTERISTICS

(75) Inventors: Jairo Moura, Marlboro, MA (US); Jay Krishnasamy, Billeric, MA (US); Martin Hosek, Lowell, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 12/163,993

(22) Filed: Jun. 27, 2008

(65) Prior Publication Data
US 2009/0033173 A1 Feb. 5, 2009

Related U.S. Application Data

(60) Provisional application No. 60/946,693, filed on Jun. 27, 2007.

(51) Int. Cl.
H02K 1/14 (2006.01)
H02K 1/16 (2006.01)
H02K 1/27 (2006.01)

(52) U.S. Cl.
USPC ............. 310/254.1; 310/216.069; 310/156.74

(58) Field of Classification Search
USPC .................. 310/156.55, 156.57, 254, 156.38, 310/156.45, 156.75, 156.76, 216.069, 254.1
IPC ....................... H02K 1/08, 1/12, 1/14, 1/16, 1/27
See application file for complete search history.

(56) References Cited

U.S. PATENT DOCUMENTS

| 2,564,221 | A | | 8/1951 | Hornfeck |
| 3,205,485 | A | | 9/1965 | Bernard |
| 3,560,774 | A | | 2/1971 | Reeves |
| 3,697,992 | A | | 10/1972 | Kleptz et al. |
| 3,750,151 | A | | 7/1973 | Dill |
| 3,860,843 | A | * | 1/1975 | Kawasaki et al. ........ 310/156.26 |
| 4,144,110 | A | | 3/1979 | Luc |
| 4,210,865 | A | | 7/1980 | Nikolaev et al. |
| 4,360,753 | A | | 11/1982 | Shannon |

(Continued)

FOREIGN PATENT DOCUMENTS

| CN | 1226307 A | 8/1999 |
| CN | 1360536 | 7/2002 |

(Continued)

OTHER PUBLICATIONS

Kim et al, Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.

(Continued)

Primary Examiner — Tran Nguyen
Assistant Examiner — Michael Andrews
(74) Attorney, Agent, or Firm — Perman & Green, LLP; Colin C. Curham

(57) ABSTRACT

A motor includes a stator and a rotor, equipped to be movable in at least a first direction relative to the stator, the rotor operably interfacing the stator so that a motor force is generated in a first direction, where the stator comprises an anti-cogging element configured to generate anti-cogging forces on the rotor in at least the first direction and a second direction at an angle to the first direction.

10 Claims, 17 Drawing Sheets

(56) References Cited

U.S. PATENT DOCUMENTS

| | | | |
|---|---|---|---|
| 4,547,678 A | 10/1985 | Metzner et al. |
| 4,556,886 A | 12/1985 | Shimizu et al. |
| 4,609,332 A | 9/1986 | Miki et al. |
| 4,628,499 A | 12/1986 | Hammett |
| 4,689,945 A | 9/1987 | Lattion et al. |
| 4,717,874 A | 1/1988 | Ichikawa et al. |
| 4,774,465 A | 9/1988 | Nilius |
| 4,874,998 A | 10/1989 | Hollis, Jr. |
| 4,922,197 A | 5/1990 | Juds et al. |
| 4,956,945 A | 9/1990 | Ooshima |
| 4,992,733 A | 2/1991 | Griebeler |
| 5,003,260 A | 3/1991 | Auchterlonie |
| 5,015,998 A | 5/1991 | Ellis et al. |
| 5,092,453 A | 3/1992 | Bruke |
| 5,105,113 A * | 4/1992 | Ishikura et al. .......... 310/154.29 |
| 5,120,034 A | 6/1992 | Van Engelen et al. |
| 5,124,863 A | 6/1992 | Koizumi et al. |
| 5,126,610 A | 6/1992 | Fremerey |
| 5,202,695 A | 4/1993 | Hollandsworth et al. |
| 5,204,621 A | 4/1993 | Hermann et al. |
| 5,210,490 A | 5/1993 | Munch et al. |
| 5,270,600 A | 12/1993 | Hashimoto |
| 5,285,154 A | 2/1994 | Burreson |
| 5,324,155 A | 6/1994 | Goodwin et al. |
| 5,334,892 A | 8/1994 | Chitayat |
| 5,351,004 A | 9/1994 | Daniels et al. |
| 5,386,738 A | 2/1995 | Havenhill |
| 5,444,368 A | 8/1995 | Horber |
| 5,450,009 A | 9/1995 | Murakami |
| 5,469,053 A | 11/1995 | Laughlin |
| 5,530,306 A | 6/1996 | Ueyama |
| 5,532,531 A * | 7/1996 | Sakamoto .............. 310/216.094 |
| 5,550,413 A | 8/1996 | Bernus et al. |
| 5,555,715 A | 9/1996 | Paweletz et al. |
| 5,568,048 A | 10/1996 | Schroeder et al. |
| 5,574,364 A | 11/1996 | Kajimoto et al. |
| 5,589,769 A | 12/1996 | Krahn |
| 5,606,256 A | 2/1997 | Takei |
| 5,625,240 A | 4/1997 | Bernus |
| 5,633,545 A | 5/1997 | Albrecht et al. |
| 5,642,298 A | 6/1997 | Mallory et al. |
| 5,670,876 A | 9/1997 | Dilger et al. |
| 5,741,113 A | 4/1998 | Bacchi et al. |
| 5,753,991 A | 5/1998 | Couture et al. |
| 5,801,721 A | 9/1998 | Gandy et al. |
| 5,808,389 A | 9/1998 | Stephenson |
| 5,808,437 A | 9/1998 | Schob |
| 5,813,823 A | 9/1998 | Hofmeister |
| 5,818,137 A | 10/1998 | Nichols et al. |
| 5,838,121 A | 11/1998 | Fairbairn et al. |
| 5,886,432 A | 3/1999 | Markle |
| 5,899,658 A | 5/1999 | Hofmeister |
| 5,914,548 A | 6/1999 | Watanabe et al. |
| 5,924,975 A | 7/1999 | Goldowsky |
| 5,932,947 A | 8/1999 | Kim |
| 5,955,882 A | 9/1999 | Eisschiel et al. |
| 5,961,291 A | 10/1999 | Sakagami et al. |
| 6,015,272 A | 1/2000 | Antaki et al. |
| 6,018,881 A | 2/2000 | Spies |
| 6,049,148 A | 4/2000 | Nichols et al. |
| 6,054,851 A | 4/2000 | Masreliez et al. |
| 6,058,760 A | 5/2000 | Van Heyningen |
| 6,078,119 A | 6/2000 | Satoh et al. |
| 6,085,760 A | 7/2000 | Chodorow |
| 6,086,362 A | 7/2000 | White et al. |
| 6,096,231 A | 8/2000 | Schertler |
| 6,100,618 A | 8/2000 | Schoeb et al. |
| 6,100,681 A | 8/2000 | Tsuruta |
| 6,127,749 A | 10/2000 | Sogard |
| 6,144,132 A * | 11/2000 | Nashiki .................... 310/156.55 |
| 6,147,421 A | 11/2000 | Takita et al. |
| 6,175,174 B1 | 1/2001 | Takahashi |
| 6,176,668 B1 | 1/2001 | Kurita et al. |
| 6,189,404 B1 | 2/2001 | Hatake et al. |
| 6,191,415 B1 | 2/2001 | Stridsberg |
| 6,206,176 B1 | 3/2001 | Blonigan et al. |
| 6,208,045 B1 | 3/2001 | Hazelton et al. |
| 6,209,045 B1 | 3/2001 | Hasegawa et al. |
| 6,227,817 B1 | 5/2001 | Paden |
| 6,235,172 B1 | 5/2001 | Begin et al. |
| 6,244,835 B1 | 6/2001 | Antaki et al. |
| 6,246,233 B1 | 6/2001 | Griffen et al. |
| 6,261,247 B1 | 7/2001 | Ishikawa et al. |
| 6,269,552 B1 | 8/2001 | Honda et al. |
| 6,285,097 B1 | 9/2001 | Hazelton et al. |
| 6,285,107 B1 | 9/2001 | Sawada et al. |
| 6,299,404 B1 | 10/2001 | Muka et al. |
| 6,324,134 B1 | 11/2001 | Ohtachi et al. |
| 6,326,750 B1 | 12/2001 | Marcinkiewicz |
| 6,384,500 B1 | 5/2002 | Chassoulier et al. |
| 6,414,742 B1 | 7/2002 | Korenaga et al. |
| 6,416,215 B1 | 7/2002 | Terentiev |
| 6,431,011 B1 | 8/2002 | Feller |
| 6,445,093 B1 | 9/2002 | Binnard |
| 6,447,265 B1 | 9/2002 | Antaki et al. |
| 6,447,266 B2 | 9/2002 | Antaki et al. |
| 6,448,760 B1 | 9/2002 | Neumann et al. |
| 6,471,459 B2 | 10/2002 | Blonigan et al. |
| 6,485,250 B2 | 11/2002 | Hofmeister |
| 6,485,531 B1 | 11/2002 | Schob |
| 6,498,411 B2 | 12/2002 | Kanebako |
| 6,509,732 B1 | 1/2003 | Rhodes et al. |
| 6,522,130 B1 | 2/2003 | Lutz |
| 6,532,791 B2 | 3/2003 | Schmid et al. |
| 6,537,011 B1 | 3/2003 | Wang et al. |
| 6,557,957 B2 | 5/2003 | Nagata et al. |
| 6,559,567 B2 | 5/2003 | Schob |
| 6,559,637 B2 | 5/2003 | Miyata et al. |
| 6,563,306 B2 | 5/2003 | Sato |
| 6,573,088 B2 | 6/2003 | Gemmell et al. |
| 6,580,190 B2 | 6/2003 | Takasu |
| 6,617,739 B1 | 9/2003 | Kinoshita |
| 6,621,245 B2 | 9/2003 | Vaassen et al. |
| 6,625,517 B1 | 9/2003 | Bogdanov et al. |
| 6,629,883 B2 | 10/2003 | Katsuoka et al. |
| 6,642,711 B2 | 11/2003 | Kawate et al. |
| 6,646,721 B2 | 11/2003 | Compter et al. |
| 6,650,079 B2 | 11/2003 | Binnard |
| 6,661,220 B1 | 12/2003 | Glehr |
| 6,690,159 B2 | 2/2004 | Burreson et al. |
| 6,691,074 B1 | 2/2004 | Moriya et al. |
| 6,698,737 B1 | 3/2004 | Blessing |
| 6,707,200 B2 | 3/2004 | Carroll et al. |
| 6,737,826 B2 | 5/2004 | Gilchrist |
| 6,781,524 B1 | 8/2004 | Clark et al. |
| 6,784,580 B2 | 8/2004 | Yashiro et al. |
| 6,800,833 B2 | 10/2004 | Gregor et al. |
| 6,803,758 B1 | 10/2004 | Nicholson |
| 6,809,450 B1 | 10/2004 | Morrison |
| 6,810,754 B2 | 11/2004 | May |
| 6,813,543 B2 | 11/2004 | Aalund et al. |
| 6,864,955 B2 | 3/2005 | Nishi et al. |
| 6,876,896 B1 | 4/2005 | Ortiz et al. |
| 6,877,963 B2 | 4/2005 | Beyer et al. |
| 6,878,044 B2 | 4/2005 | Sakurai et al. |
| 6,879,063 B2 | 4/2005 | Frissen et al. |
| 6,879,076 B2 | 4/2005 | Long |
| 6,879,126 B2 | 4/2005 | Paden et al. |
| 6,909,281 B2 | 6/2005 | Gassman et al. |
| 6,917,136 B2 * | 7/2005 | Thornton et al. .......... 310/254.1 |
| 6,927,505 B2 | 8/2005 | Binnard et al. |
| 6,940,274 B2 | 9/2005 | Wakiyama et al. |
| 6,952,086 B1 | 10/2005 | Krefta et al. |
| 6,989,647 B1 | 1/2006 | Lee |
| 6,991,710 B2 | 1/2006 | Harris et al. |
| 6,995,534 B2 | 2/2006 | Berroth et al. |
| 7,005,847 B2 | 2/2006 | Gassman et al. |
| 7,023,118 B1 | 4/2006 | Morrison |
| 7,030,528 B2 | 4/2006 | Morganet |
| 7,053,582 B2 | 5/2006 | Ueyama et al. |
| 7,067,952 B2 | 6/2006 | Neal |
| 7,070,398 B2 | 7/2006 | Olsen et al. |
| 7,073,521 B2 | 7/2006 | Sakai |
| 7,075,197 B2 | 7/2006 | Korenaga |

(56) References Cited

U.S. PATENT DOCUMENTS

| | | |
|---|---|---|
| 7,087,143 B1 | 8/2006 | Schmidt et al. |
| 7,115,066 B1 | 10/2006 | Lee |
| 7,135,855 B2 | 11/2006 | Nyce |
| 7,164,120 B2 | 1/2007 | Strasser |
| 7,196,604 B2 | 3/2007 | Sills et al. |
| 7,205,741 B2 | 4/2007 | Simons et al. |
| 7,208,945 B2 | 4/2007 | Jones et al. |
| 7,211,918 B2 | 5/2007 | Migita et al. |
| 7,229,258 B2 | 6/2007 | Wood et al. |
| 7,230,355 B2 | 6/2007 | Lin et al. |
| RE39,748 E | 7/2007 | Watanabe et al. |
| 7,245,047 B2 | 7/2007 | Vreugdewater et al. |
| 7,246,985 B2 | 7/2007 | Ferrara |
| 7,248,037 B2 | 7/2007 | Hara et al. |
| 7,264,430 B2 | 9/2007 | Bischof et al. |
| 7,292,656 B2 | 11/2007 | Kloper et al. |
| 7,315,164 B2 | 1/2008 | Hata et al. |
| 7,325,559 B2 | 2/2008 | Darut et al. |
| 7,339,370 B2 | 3/2008 | Reimer et al. |
| 7,352,553 B2 | 4/2008 | Kozaki et al. |
| 7,359,032 B2 | 4/2008 | Dansberg et al. |
| 7,371,306 B2 | 5/2008 | Davis et al. |
| 7,400,141 B2 | 7/2008 | Taniguchi et al. |
| 7,424,830 B2 | 9/2008 | Matsusaki et al. |
| 7,467,930 B2 | 12/2008 | Ozaki et al. |
| 7,468,589 B2 | 12/2008 | Cox et al. |
| 7,508,099 B2 | 3/2009 | Korenaga |
| 7,575,406 B2 | 8/2009 | Hofmeister et al. |
| 7,578,649 B2 | 8/2009 | Caveney et al. |
| 7,633,201 B2 | 12/2009 | Buhler et al. |
| 7,642,773 B2 | 1/2010 | Takahashi et al. |
| 7,795,861 B2 | 9/2010 | Englert et al. |
| 7,843,101 B2 | 11/2010 | Ito et al. |
| 7,868,610 B2 | 1/2011 | Velinsky et al. |
| 7,897,025 B2 | 3/2011 | Inoue et al. |
| 7,906,959 B2 | 3/2011 | Frachon et al. |
| 8,052,504 B2 | 11/2011 | Kalenian et al. |
| 8,104,488 B2 | 1/2012 | Rye et al. |
| 2001/0036398 A1 | 11/2001 | Hofmeister |
| 2001/0044266 A1 | 11/2001 | Katsuoka et al. |
| 2002/0021423 A1 | 2/2002 | Korenaga et al. |
| 2002/0041168 A1 | 4/2002 | Mann et al. |
| 2002/0060548 A1 | 5/2002 | Iwaji et al. |
| 2002/0070617 A1 | 6/2002 | Kanebako |
| 2002/0089324 A1 | 7/2002 | Miyata et al. |
| 2002/0097042 A1 | 7/2002 | Kawate et al. |
| 2002/0105241 A1* | 8/2002 | Carroll et al. ............... 310/90.5 |
| 2002/0135358 A1 | 9/2002 | Sager et al. |
| 2002/0149270 A1 | 10/2002 | Hazelton |
| 2003/0011338 A1 | 1/2003 | Gilchrist |
| 2003/0025413 A1 | 2/2003 | Takasu |
| 2003/0085676 A1 | 5/2003 | Binnard |
| 2003/0102721 A1 | 6/2003 | Ueta et al. |
| 2003/0102748 A1 | 6/2003 | Yashiro et al. |
| 2003/0107289 A1 | 6/2003 | Thornton et al. |
| 2003/0183611 A1 | 10/2003 | Gregor et al. |
| 2003/0223853 A1 | 12/2003 | Caveney et al. |
| 2003/0236644 A1 | 12/2003 | Lara et al. |
| 2004/0021437 A1 | 2/2004 | Maslov et al. |
| 2004/0034988 A1 | 2/2004 | Neal |
| 2004/0070300 A1* | 4/2004 | Fu ........................ 310/156.47 |
| 2004/0072499 A1 | 4/2004 | Wakabayashi |
| 2004/0075426 A1 | 4/2004 | Wakiyama et al. |
| 2004/0124729 A1 | 7/2004 | Long |
| 2004/0194565 A1* | 10/2004 | Okada et al. ................. 74/111 |
| 2004/0217667 A1* | 11/2004 | Popov .................... 310/156.57 |
| 2004/0261550 A1 | 12/2004 | Asa |
| 2004/0261944 A1 | 12/2004 | Wakabayashi |
| 2005/0002743 A1 | 1/2005 | Moriya et al. |
| 2005/0089422 A1 | 4/2005 | Ozaki et al. |
| 2005/0135942 A1 | 6/2005 | Wood et al. |
| 2005/0136694 A1 | 6/2005 | Inoue et al. |
| 2005/0151544 A1 | 7/2005 | Mahoney et al. |
| 2005/0184689 A1 | 8/2005 | Maslov et al. |
| 2005/0188798 A1 | 9/2005 | Bischof et al. |
| 2005/0242576 A1 | 11/2005 | Darut et al. |
| 2005/0264119 A1 | 12/2005 | Carroll et al. |
| 2005/0265814 A1 | 12/2005 | Coady |
| 2005/0269892 A1 | 12/2005 | Duff Jr. |
| 2006/0017340 A1 | 1/2006 | Kozaki et al. |
| 2006/0091759 A1 | 5/2006 | Migita et al. |
| 2006/0099063 A1 | 5/2006 | Pietrantonio et al. |
| 2006/0113949 A1 | 6/2006 | Nishimura et al. |
| 2006/0125334 A1 | 6/2006 | Kataoka et al. |
| 2006/0125473 A1 | 6/2006 | Frachon et al. |
| 2006/0205553 A1 | 9/2006 | Lee |
| 2006/0219275 A1 | 10/2006 | Weber et al. |
| 2006/0238053 A1 | 10/2006 | Kascak et al. |
| 2006/0238063 A1 | 10/2006 | Neal |
| 2006/0275155 A1 | 12/2006 | Thibodeau |
| 2006/0279149 A1 | 12/2006 | Asper |
| 2007/0020081 A1 | 1/2007 | Gilchrist et al. |
| 2007/0024138 A1 | 2/2007 | Buhler et al. |
| 2007/0065144 A1 | 3/2007 | Hofmeister et al. |
| 2007/0120556 A1 | 5/2007 | Dufour et al. |
| 2007/0194787 A1 | 8/2007 | Takahashi et al. |
| 2007/0269986 A1 | 11/2007 | Kalenian et al. |
| 2007/0295089 A1 | 12/2007 | Velinsky et al. |
| 2007/0299625 A1 | 12/2007 | Englert et al. |
| 2008/0011334 A1 | 1/2008 | Rye et al. |
| 2008/0067968 A1 | 3/2008 | Binnard et al. |
| 2008/0116881 A1 | 5/2008 | May |
| 2008/0120164 A1 | 5/2008 | Hassler |
| 2008/0121064 A1 | 5/2008 | Todorov |
| 2009/0243413 A1 | 10/2009 | Gilchrist et al. |
| 2010/0178135 A1 | 7/2010 | Lacecy et al. |
| 2011/0025310 A1 | 2/2011 | Moura et al. |

FOREIGN PATENT DOCUMENTS

| | | |
|---|---|---|
| CN | 1457434 | 11/2003 |
| EP | 0129731 | 1/1985 |
| EP | 0414127 | 2/1991 |
| EP | 0526903 | 2/1993 |
| EP | 0565746 | 10/1993 |
| EP | 0121084 | 10/1994 |
| EP | 0641061 A2 | 3/1995 |
| EP | 0675824 B1 | 10/1996 |
| EP | 0758157 A2 | 2/1997 |
| EP | 0760244 A1 | 3/1997 |
| EP | 0816701 A1 | 1/1998 |
| EP | 1052761 A2 | 11/2000 |
| EP | 1054498 A1 | 11/2000 |
| EP | 1176999 B1 | 7/2005 |
| EP | 01732011 | 12/2006 |
| GB | 1552874 | 9/1979 |
| GB | 2035622 | 6/1980 |
| JP | 57165702 | 10/1982 |
| JP | 60170702 | 9/1985 |
| JP | 61152304 A | 7/1986 |
| JP | 61172077 | 8/1986 |
| JP | 24024 | 6/1988 |
| JP | 1023468 | 1/1989 |
| JP | 1240268 | 9/1989 |
| JP | 02036313 | 2/1990 |
| JP | 02193547 | 7/1990 |
| JP | 3178747 | 8/1991 |
| JP | 3276317 | 12/1991 |
| JP | 4209996 | 7/1992 |
| JP | 4308823 | 10/1992 |
| JP | 04364752 | 12/1992 |
| JP | 5130762 | 5/1993 |
| JP | 05346322 | 12/1993 |
| JP | 623687 | 2/1994 |
| JP | 6213233 A | 8/1994 |
| JP | 3147568 | 9/1994 |
| JP | 7012091 A | 1/1995 |
| JP | 07255158 | 3/1995 |
| JP | 7131966 A | 5/1995 |
| JP | 07161790 | 6/1995 |
| JP | 08203977 | 9/1996 |
| JP | 8323505 A | 12/1996 |
| JP | 0993723 | 4/1997 |
| JP | 09269007 | 10/1997 |

(56) References Cited

FOREIGN PATENT DOCUMENTS

| | | |
|---|---|---|
| JP | 10023781 | 1/1998 |
| JP | 10070865 | 3/1998 |
| JP | 10316241 | 12/1998 |
| JP | 11030502 | 2/1999 |
| JP | 11166803 | 6/1999 |
| JP | 11257909 | 9/1999 |
| JP | 2000131006 | 5/2000 |
| JP | 2001074006 | 3/2001 |
| JP | 2001156150 | 6/2001 |
| JP | 2001224154 | 8/2001 |
| JP | 200226105 | 1/2002 |
| JP | 2002511571 | 4/2002 |
| JP | 2004245703 | 9/2004 |
| JP | 200368620 | 10/2004 |
| JP | 2005158826 | 6/2005 |
| JP | 2005223997 | 8/2005 |
| JP | 2006013371 | 6/2006 |
| JP | 2006214736 | 8/2006 |
| JP | 2006014592 | 12/2006 |
| JP | 2007024694 A | 2/2007 |
| JP | 2008516457 | 5/2008 |
| JP | 2008196894 | 8/2008 |
| JP | 4333421 | 9/2009 |
| WO | 8912907 | 12/1989 |
| WO | 9414653 | 7/1994 |
| WO | 9742413 A1 | 11/1997 |
| WO | 9837335 | 8/1998 |
| WO | 9904481 | 1/1999 |
| WO | 0102211 | 1/2001 |
| WO | 0102721 | 1/2001 |
| WO | 0231372 | 4/2002 |
| WO | 0241473 | 5/2002 |
| WO | 03029651 | 4/2003 |
| WO | 2004098677 | 11/2004 |
| WO | 2005003565 | 1/2005 |
| WO | 2005114818 | 12/2005 |
| WO | 2006010285 | 2/2006 |
| WO | 2006053384 | 5/2006 |
| WO | 2007029623 A1 | 3/2007 |
| WO | 2007068496 | 6/2007 |
| WO | 2008039943 | 4/2008 |
| WO | 2009003186 | 12/2008 |

OTHER PUBLICATIONS

Arreola, Rafael Becerril, Nonlinear Control Design for a Magnetic Levitation System, A thesis submitted in conformity with the requirements of the degree of Master of Applied Science, Copyright by Rafael Becerril Arreola 2003.
Thornton et al, The MangeMotion Maglev System M3, TRB 2003 Annual Meeting CD-ROM, pp. 1-15, 2003.
Arreola, Rafael Becerril, Output feedback nonlinear control for a linear motor in suspension mode, Automatica, 2004, Elsevier, 2004.
Chinese Office Action dated Mar. 7, 2012.
Chinese Office Action dated Aug. 18, 2011.
Chinese Office Action dated Jan. 19, 2011.
Benarous et al., Sinusoidal Shaft Position Encoder, 31 March-2 April. 3 2004, IEEE Conference Publication 2004, No. 498, pp. 132-136, IEEE International Conference on Power Electronics, Machines and Drives.
Carpenter, C.J. Electromagnetic induction in terms of Maxwell force instead of magnetic flux, Science, Measurement and Technology, Lee Proceedings, Jul. 1999, vol. 146, Issue 4, pp. 182-193. (abstract) IEEE [online].
Cho et al, Analysis and design of synchronous permanent magnet planar motors, Cho et al., Power Engineering Review, Jul. 2002, vol. 22, pp. 52-52, IEEE.
Duan et al, Analysis and comparison of two-dimensional permanent magnet array for planar motor, Magnetics, IEEE Transactions, Nov. 2004, vol. 40, pp. 3490-3494.
Etxaniz et al., Design of Magnetically levitated 2D drive, COMPEL, 2006, vol. 25, pp. 732-740, Emerald Group Publishing Ltd, Sep. 2005.
Gallo, C.A., Halbach Magnetic Rotor Development, NASA Glenn Research Center, Report Number: NASAITM-2008-215056; E-16281, Feb. 2008, p. 27, CAS.
Goa et al., A surface motor-driven planar motion stage integrated with an XYO(z) surface encoder for precision positioning, Precision Engineering Journal of the International Societies for Precision Engineering and Nanotechnology, 2004, vol. 28, pp. 329-337, Jul. 2004.
Jang et al., Design and analysis of helical motion permanent magnet motor with cylindrical Halbach array, IEEE Transactions, Sep. 2003, vol. 39, pp. 3007-3009.
Jansen et al., Magnetically levitated planar actuator with moving magnets, Ieee International Electric Machines and Drives Conference, 2007, pp. 272-278, IEEE, Oct. 2007.
Kawato et al., A Novel Multi-DOF Precision Positioning Methodology Using Two-Axis Hall-Effect Sensors, 2005 American Control Conference, Jun. 8-10, 2005, pp. 3042-3047, IEEE.
Kim et al., Analysis and implementation of a tubular motor with Halbach magnetarray, Industry Application Conference, 1996, vol. 1, pp. 471-478, San Diego, CA, IEEE, Oct. 1996.
Konkola et al., Electromagnetic design of a low-fringing-field magnetic bearing stage for electron beam lithography: Special issue on magnetic bearing, JSME international journal, Series C, Mechanical Systems, 2003, vol. 46, pp. 370-377, Sep. 2002.
Park et al., Analysis and Control of 2-D of Magnetic Levitation Stage Using Force Decoupling Theorem, Siceicase, 2006, pp. 1091-1095, Oct. 2006.
Popovic et al., A New CMOS Hall Angular Position Sensor, Technisches Messen, 2001, pp. 286-291, vol. 68, No. 6, June, Swiss Fed. Institute Tech., Lausanne, Switzerland. Feb. 2001.
Precision Engineering, The Long-Range Scanning Stage: A Novel Platform for Scanned-Probe Microscopy, Journal of the International Societies for Precision Engineering and Nanotechnology, 2000, pp. 191-209, vol. 24, Elsevier Science, Inc., United States, Jun. 1999.
Rajagopal et al., Static Torque Profiles of a Hybrid Stepper Motor Having Eccentricity Between Stator and Rotor Axes, May 15, 2003, pp. 8701-8703, vol. 93, No. 10, A.I.P., Journal of Applied Physics, United States.
Schott et al, A New Two-Axis Magnetic Position Sensor, 2002, pp. 911-915, IEEE, Jun. 2002.
Wereb, J.A., Sine-Cosine Rotation Sensor for 360 Degree Angle Measurement Sensors, 995, pp. 40-41, vol. 12, No. 11, Elweco, Inc., United States, Nov. 1995.
Yan et al., Coding of Shared Track Grey Encoder, Journal of Dynamic Systems, Measurement and Control, vol. 122, pp. 573-576, ASME, Sep. 2000.
International Preliminary Report on Patentability dated Aug. 2009; Application PCT/US08/68682.
International Preliminary Report on Patentability dated Sep. 11, 2009; Application PCT/US08/68160.
International Preliminary Report on Patentability dated Sep. 22, 2009; Application PCT/US08/68167.
International Preliminary Report on Patentability dated Dec. 10, 2009; Application PCT/US08/68680.
International Preliminary Report on Patentability dated Jan. 15, 2010; Application PCT/US08/68684.
International Preliminary Report on Patentability dated Jan. 25, 2011; Application PCT/US08/68661.
International Search Report, PCT/US2008/068670, Sep. 2, 2008, 1 page.
International Search Report, PCT/US2008/068682 Sep. 3, 2008, 1 page.
International Search Report, PCT/US2008/068680, Sep. 3, 2008, 2 pages.
International Search Report, PCT/US 08/68160, Sep. 11, 2008, 1 page.
International Search Report, PCT/US 08/68167, Sep. 11, 2008, 1 page.
International Search Report, PCT/US 08/68684 Oct. 9, 2008, 1 page.
International Search Report, PCT/US 08/68661, Oct. 22, 2008, 1 page.
Taiwan IPO search Report, Application No. 097124040, dated May 19, 2013, 1 page.
International Preliminary Report of Patentability dated Jan. 19, 2010; Application PCT/US08/070346.
International Search Report, PCT/US/2008/070346, Oct. 7, 2008.

\* cited by examiner

MOTOR STATOR WITH LIFT CAPABILITY AND REDUCED COGGING CHARACTERISTICS

This application claims the benefit of U.S. Provisional Patent application 60/946,693, entitled: MOTOR STATOR WITH LIFT CAPABILITY AND REDUCED COGGING CHARACTERISTICS, filed 27 Jun. 2007, which is incorporated by reference herein in its entirety.

This application is related to U.S. patent application Ser. No. 11/769,688, entitled: COMMUTATION OF AN ELECTROMAGNETIC PROPULSION AND GUIDANCE SYSTEM, filed 27 Jun. 2007, U.S. patent application Ser. No. 11/769,651, entitled: REDUCED-COMPLEXITY SELF-BEARING BRUSHLESS DC MOTOR, filed 27 Jun. 2007, U.S. Provisional Patent application 60/946,686, entitled: POSITION FEEDBACK FOR SELF BEARING MOTOR, filed 27 Jun. 2007, all of which are incorporated by reference herein in their entirety.

BACKGROUND

The present invention relates to a motor stator, in particular, to a reduced complexity motor stator with reduced cogging characteristics.

BRIEF DESCRIPTION OF RELATED DEVELOPMENTS

Iron core motors are widely used in various applications. The ferromagnetic core provides substantial gain in the magnetic flux density across an air gap between a rotor with permanent magnets and a stator. As a result, the motor constant is substantially higher when compared to ironless design counterparts. On the other hand, conventional stators are constructed with slots and the attractive forces between the permanent magnets on the rotor and the slot teeth on the stator generate high cogging torques or forces, which are highly undesirable disturbances for precise motion control of either rotary or linear motors.

In an exemplary application, substrate processing equipment is typically capable of performing multiple operations on a substrate. U.S. Pat. No. 4,951,601 discloses a substrate processing apparatus with multiple processing chambers and a substrate transport apparatus. The substrate transport apparatus moves substrates among the processing chambers where different operations, such as sputtering, etching, coating, soaking, etc., are performed. Production processes used by semiconductor device manufacturers and material producers often require precise positioning of substrates in the substrate processing equipment. A transport apparatus may include a considerable number of active components, including a number of motors. Cogging may affect the accuracy in transport applications. Other functions using motors may also be adversely affected by cogging.

In certain applications, materials must be processed in a controlled, clean atmosphere where microscopic contaminates may represent a severe problem. In those applications, cleanliness may be directly related to yield, which may in turn affect cost. Other applications may include processing steps utilizing hostile atmospheres of highly corrosive gases and high temperatures. Motors with contact bearings may wear, produce particulate contamination, and eventually fail due to the hostile environment. Bearings may also exhibit an unacceptable amount of vibration and play before failing. Self-bearing motors may provide a viable alternative for these applications. In order to maximize torque and centering forces generation, self-bearing motors may typically include toothed stators with segmented windings wound in sectors around the stator.

A self bearing motor may suffer from cogging force disturbances along the tangential, radial and axial directions. It would be advantageous to provide elements and techniques arranged to minimize cogging disturbances along these directions.

BRIEF DESCRIPTION OF THE DRAWINGS

The foregoing aspects and other features of the invention are explained in the following description, taken in connection with the accompanying drawings, wherein.

DETAILED DESCRIPTION

Although the presently disclosed embodiments will be described with reference to the drawings, it should be understood that they may be embodied in many alternate forms. It should also be understood that in addition, any suitable size, shape or type of elements or materials could be used.

Figure 1A:
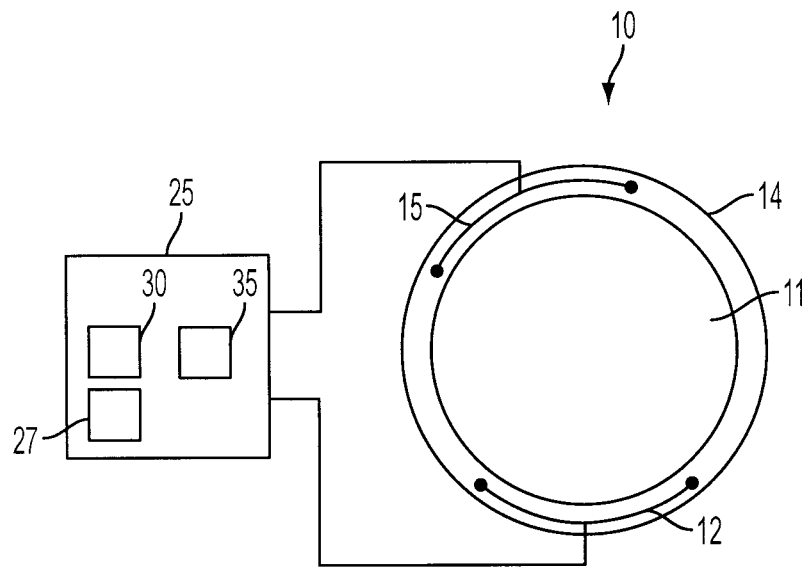
FIG. 1A shows a diagram of an exemplary motor suitable for practicing the disclosed embodiments.
Figure 1B:
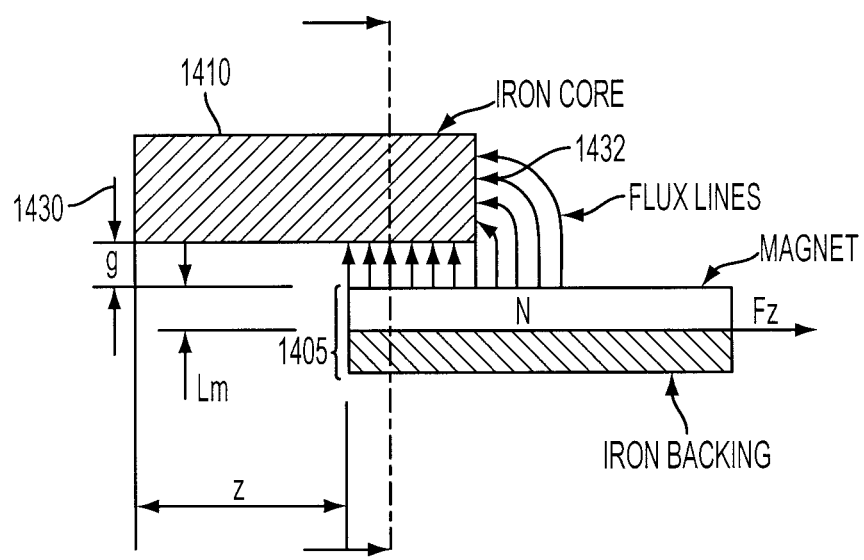
FIG. 1B shows a cross-section schematic diagram of the stator and rotor configuration in the exemplary embodiment.

FIGS. 1A and 1B show a schematic diagram of an exemplary motor 10 suitable for practicing the embodiments disclosed herein. Although the presently disclosed embodiments will be described with reference to the drawings, it should be understood that they may be embodied in many alternate forms. It should also be understood that any suitable size, shape or type of elements or materials could be used.

In the embodiment of FIG. 1A, motor 10 includes an actuated component referred to as a rotor 11, winding sets 12, 15, and a stator 14. For purposes of the disclosed embodiments, it should be understood that the term actuated component includes a device that performs a motion or applies a force in response to forces generated by the winding sets described herein. The rotors and platens of the disclosed embodiments are examples of actuated components.

The embodiment of exemplary motor 10 depicted in FIG. 1A is shown as having a rotary configuration, although other embodiments may include linear configurations as will be described below. Winding sets 12, 15 may include one or more windings and may be driven by current amplifier 25 which may include software, hardware, or a combination of software and hardware suitable for driving the winding sets. The current amplifier 25 may also include a processor 27, a commutation function 30 and a current loop function 35 for driving the winding sets. The commutation function 30 may supply current for one or more windings of each winding set according to a set of specified functions, while the current loop function 35 may provide a feedback and driving capability for maintaining the current through the windings as supplied. The processor 27, commutation function 30, and current loop function 35 may also include circuitry for receiving feedback from one or more sensors or sensor systems that provide position information. Each current amplifier disclosed herein includes circuitry, hardware or software in any combination as required to perform the functions and computations for the disclosed embodiments.

Figure 2:
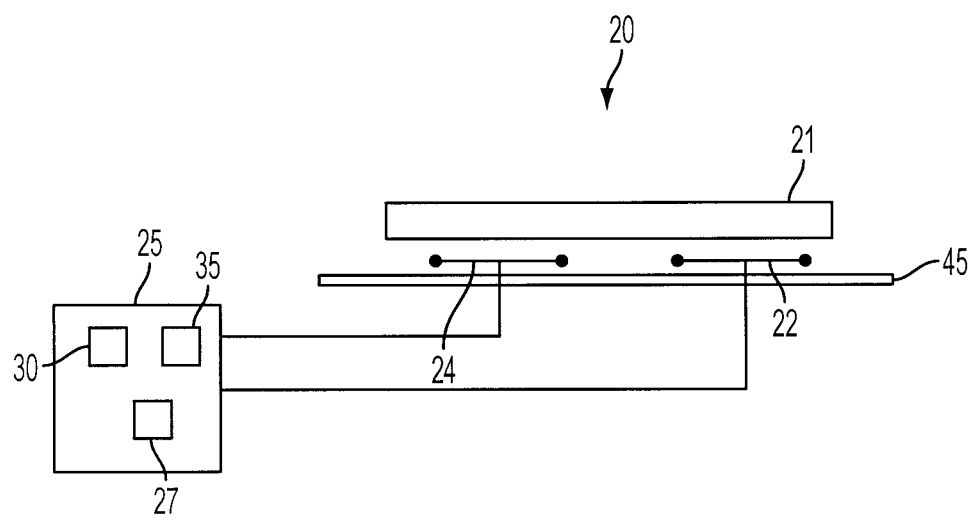
FIG. 2 shows a diagram of another exemplary motor suitable for practicing the disclosed embodiments.

FIG. 2 shows another exemplary embodiment having a linear configuration. Motor 20 includes an actuated component 21, in this embodiment having the form of a platen, winding sets 22, 24 and a stator 45. Similar to the embodiment of FIG. 1, rotor 21 may be constructed in any suitable manner and winding sets 22, 24 may include one or more windings.

Both motors 10, 20 may utilize a minimal air gap and ferromagnetic materials to affect a substantial gain in the magnetic flux density across the air gap which in turn produces desired passive axial and passive tilt stiffness. Motors 10, 20 may be embodied as synchronous, brushless motors. Motors 10, 20 may also be embodied as other types of motors.

Figure 1C:
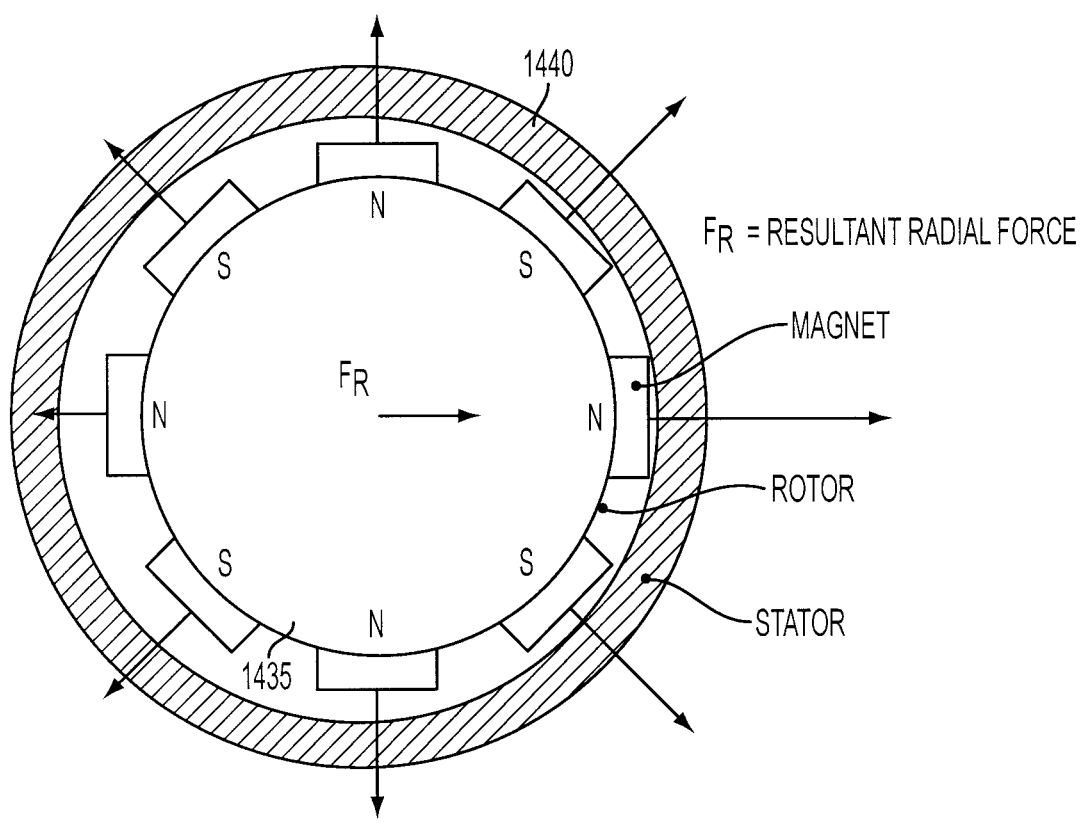
FIG. 1C shows a schematic diagram of resulting radial forces that may contribute to cogging.
Figure 1D:
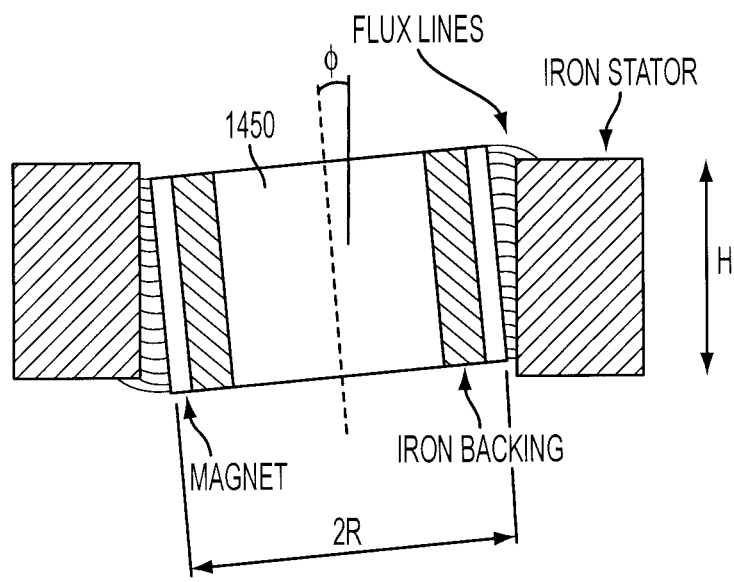
FIG. 1D shows a schematic diagram of tilting forces that may contribute to cogging.
Figure 1D:
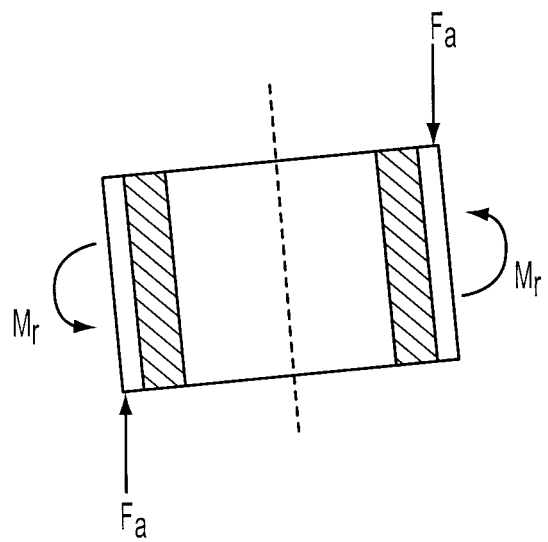

FIG. 1B shows a cross-section schematic diagram of the stator and rotor (e.g. actuated component) configuration in the exemplary embodiment and the axial forces resulting from the shown configuration that may contribute to cogging. In the exemplary embodiment shown, the motor arrangement is capable of producing passive axial lift of the actuating component. For example in FIG. 1B, the actuating element 1405 is displaced along the Z axis, and the flux lines extend outside gap 1430 across a surface of the stator 1432 perpendicular to the gap 1430, hence generating lift forces. FIG. 1C shows a schematic diagram of the stator and rotor configuration in the disclosed embodiment that generates passive radial forces and the resulting radial forces that may contribute to cogging. For example, variances in the gap between the magnets N, S on the rotor 1435 and the stator 1440 causes a resultant radial force $F_R$. FIG. 1D shows a schematic diagram of the stator and rotor configuration in the disclosed embodiment that provides passive tilt and pitch stiffness and the resulting tilting forces that may contribute to cogging. For example, passive tilting forces acting rotor 1450 cause resulting counteracting axial and radial moments producing the desired tilt and pitch stiffness.

The desired axial and tilt stiffness and other functional parameters may result in an uneven stator profile. However, in a conventional motor the gain in the magnetic flux density and the uneven stator profile may also cause significant cogging forces when the distance across the air gap changes abruptly. The disclosed embodiments are directed to various exemplary elements that minimize cogging.

Figure 3:
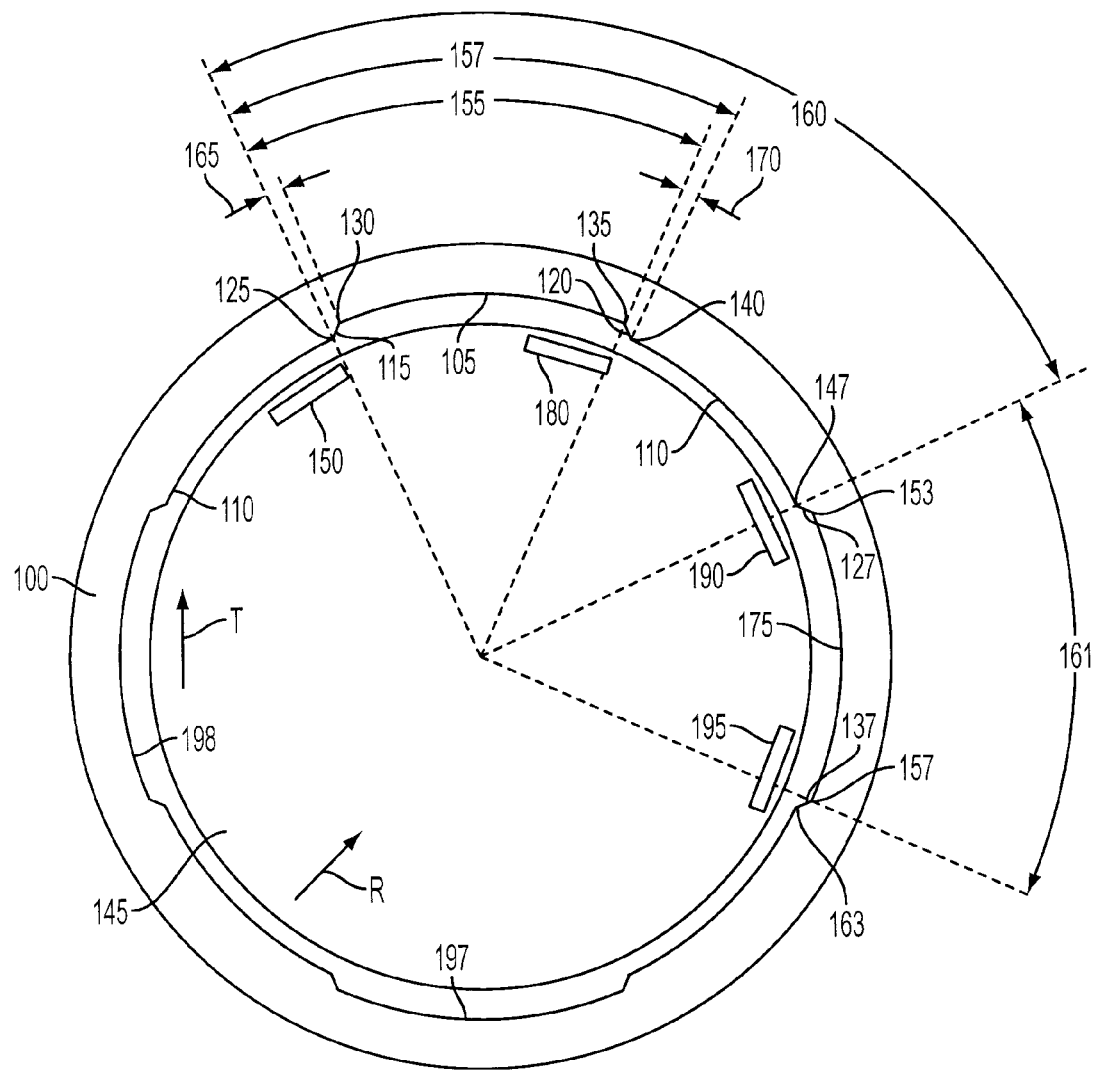
FIGS. 3 and 4 show diagrams of exemplary anti-cogging elements according to the disclosed embodiments.
Figure 4:
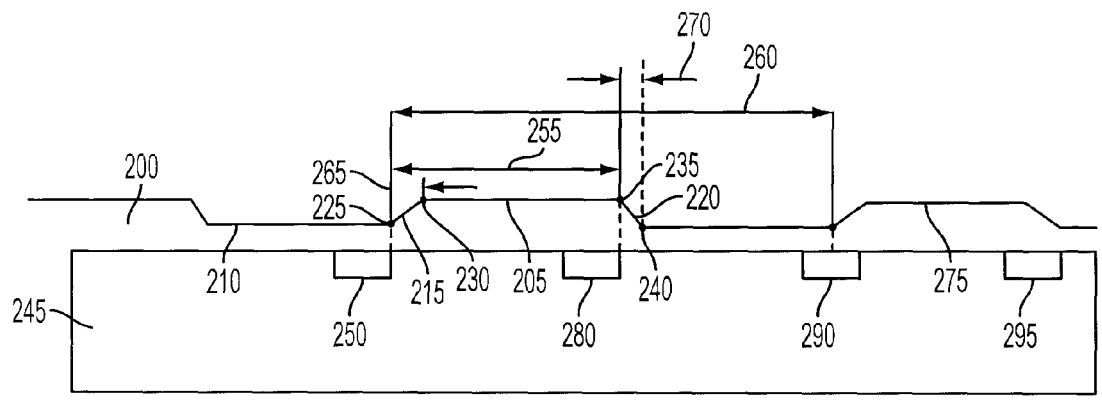

FIGS. 3 and 4 show schematic diagrams of exemplary elements for use in the disclosed embodiments. The exemplary elements in FIGS. 3 and 4 may be embodied as part of stators 100, 200 for a rotary motor and a linear motor, respectively. Some embodiments may also include an arrangement of the magnets 150, 180, 190, 195, 250, 280, 290, and 295.

The presently disclosed embodiments include one or more exemplary elements and techniques that, while producing a desired amount of axial and tilt stiffness, operate to minimize cogging disturbances along a number of axes. At least some of the disclosed embodiments utilize the elements in such a way that the superposition of the cogging forces caused by each element component results in a minimal overal cogging disturbance along the propulsion, gap, and axial directions.

In some embodiments, if a stator recess or a stator discontinuity is warranted, for reasons such as axial, and tilt stiffness, then cogging may be minimized by, for example, a proper choice of the lengths of the recesses or stator segments, and relative spacing between the stator segments and the shape of a transition zone at the stator segment ends. Other structures and techniques may also be employed.

FIG. 3 shows exemplary elements embodied in a stator 100 for a rotary motor. The stator 100 may include a number of recesses 105, 175 that extend inward from a first surface 110 of the stator 100. In FIG. 3, four recesses 105, 175, 197, 198 are shown for example purposes, though in alternate embodiments the stator may have more or fewer recess sections. In the exemplary embodiment, the recesses are shown as being substantially similar to each other and evenly distributed around the perimeter of the stator. In alternate embodiments the recesses may be located in any suitable manner, and the configuration of the recesses, and in particular of the transitions of the recesses, may be different as will be described further below. Each recess may include two transition areas from the first surface to the recess. For example, recess 105 may include first and second transition areas 115, 120, respectively, between the first surface 110 and the recess 105. First transition area 115 may include a first transition portion 125 and a second transition portion 130 and second transition area 120 may include a third transition portion 135 and a fourth transition portion 140. Similarly, recess 175 may include first and second transition areas 127, 137, respectively, between the first surface 110 and the recess 175. First transition area 127 may include a first transition portion 147 and a second transition portion 153 and second transition area 137 may include a third transition portion 157 and a fourth transition portion 163. As shown in FIG. 3, at least one set of the first and second transition portions and the third and fourth transition portions may be located a distance from a radial center of the rotor.

A rotor 145 for operation with the stator 100 may include a plurality of permanent magnets with adjacent magnets having alternating polarities. Magnets 150, 180, 190, and 195 are shown for illustrative purposes. It should be understood that other magnets may be dispersed among the magnets shown.

An exemplary configuration of the stator 100 will now be described in greater detail. It should be understood that any suitable dimensions may be utilized in accordance with the disclosed embodiments. In at least one exemplary embodiment, the distance 155 between the first transition portion 125 and the third transition portion 135 may be approximately nP/2+($\epsilon$) where n may be any integer, P is the pitch between magnets of the same polarity, and $\epsilon$ may be an adjustment factor as will be explained below. In one embodiment, cooperating recesses 105, 175 (shown adjacent in FIG. 3 for example purposes) may have the same distance between their first and third transition portions. In the exemplary embodiment, the distance 160 between the first transition portion 125 of recess 105 and the first transition portion 147 of adjacent recess 175 (in the direction of travel) may be approximately nP/2+mP/4, where mP/4 represents an offset between corresponding magnets along adjacent recesses (e.g. m may be an odd integer 1, 3, 5 . . . ).

The distance 165 between the first and second transition portions 125, 130 may be any suitable distance. In the exemplary embodiment, the distance 170 between the third and fourth transition portions 135, 140 of the same recess may be similar to distance 165 though in alternate embodiments the respective distances, slopes, or shapes of the first and second transition areas may be different as will be described further below. In the exemplary embodiment, the distance 157 between first transition 125 portion and fourth transition portion 140 (e.g. the overall distance between initial and final transition) of the section may be approximately nP/2+L, where L is the distance 170 of the transition area 120. In the exemplary embodiment, the cooperating recess 175 may have an overall distance 161 (between corresponding initial and final transitions) similar to distance 157, though in alternate embodiments the cooperating recess may have any overall distance that satisfies nP/2+L.

One or more exemplary elements configured for cogging reduction are also shown in FIG. 4, for example, embodied in a stator 200 for a linear motor. Similar to the stator 100, stator 200 may include two or more recesses 205 that extend inward from a first surface 210 of the stator 200. Each recess 205 may include first and second transition areas 215, 220, respectively, between the first surface 210 and the recess 205. First transition area 215 may include a first transition portion 225 and a second transition portion 230 and second transition area 220 may include a third transition portion 235 and a fourth transition portion 240.

Exemplary dimensions of the stator 200 for the linear embodiments will now be described. It should be understood that any suitable dimensions may be utilized in accordance with the disclosed embodiments. In at least one exemplary embodiment, the linear distance 255 from the first transition portion 225 and the third transition portion 235 (in the direction of travel) may be expressed as approximately nP/2+($\epsilon$) where n is an integer, P is the pitch between magnets of the same polarity, and $\epsilon$ is an adjustment factor similar to the embodiment of FIG. 3. The linear distance 260 between first transition portions 225 of adjacent recesses 205, 275 may be approximately nP/2+mP/4. Distances 265 and 270 may be the same, while in other embodiments they may be different.

A platen 245 for operation with the stator 200 may include a plurality of permanent magnets with alternating polarities. Magnets 250, 280, 290, and 295 are shown for illustrative purposes. It should be understood that other magnets may be dispersed among the magnets shown.

The operation of the embodiments of FIGS. 3 and 4 will now be described.

As noted before, in the exemplary embodiment, the elements of the motor may be selected to minimize cogging in directions of propulsion, gap and axial forces, simultaneously. While the operation of the embodiment of FIG. 3 will now be described with respect to a propulsion direction, for example, a clockwise movement of the rotor, it should be understood that the embodiment is functional with other propulsion directions, for example, a counterclockwise movement of the rotor. Because of the distance 155 described above, magnets 150, 180 (which as may be realized are spaced at distance nP/2 from each other traveling clockwise in the exemplary embodiment) will approach first and third transition portions 125 and 135, respectively at approximately the same time subject to various adjustments related to adjustment factor $\epsilon$ described below.

As magnet 150 passes over first transition portion 125, magnet 150 is subject to a counterclockwise tangential force opposite the propulsion force, referred to as cogging due to the step in the stator surface (generally facing in the tangential direction) associated with the first transition 115. Magnet 180 may be subject to a clockwise tangential force in the direction of propulsion, also referred to as cogging due to the step associated with the second transition area 120 as magnet 180 passes over third transition portion 135. Accordingly, the counterclockwise tangential force operating on magnet 150 and the clockwise tangential force operating on magnet 180 may oppose and cancel each other. Thus, opposing cogging forces may be employed to minimize or eliminate cogging of the rotor 145. In this example, if the distance 155 was approximately nP/2 magnet 180 may be subject to cogging before magnet 150 because of the orientation of second transition area 120. Adjustment factor $\epsilon$ may be chosen to adjust the distance 155 to compensate for such orientation so that generation of cogging forces may be substantially in phase for best cancellation. Adjustment factor $\epsilon$ may also include adjustments for other cogging differences between magnets 150, 180. For example, $\epsilon$ may include components that compensate for manufacturing tolerances of stator 100, rotor 145, differences in the shape of magnets 150, 180 or for any other suitable compensation. In other alternate embodiments, the distance between first and third transition portions may have no adjustment factor, and phase compensation of canceling cogging forces may be effected by shape, scope, or other differences in the first and second transition areas. In other alternate embodiments, the adjustment factor $\epsilon$ may be used together with different shaped transition areas.

Figure 5A:
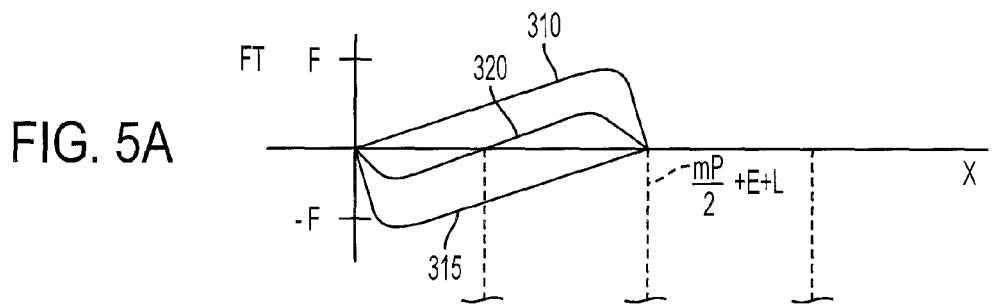
FIGS. 5A through 5C show diagrams of exemplary tangential cogging forces resulting from the disclosed embodiments.

FIG. 5A shows a diagram of the tangential cogging force 310 on magnet 150, the tangential cogging force 315 on magnet 180 and a resulting tangential cogging force 320 from the sum of tangential cogging forces 310 and 315, as a consequence of the exemplary dimensions of stator 100. Because magnets 150 and 180 approach and pass first and third transition portions 125 and 135, respectively at approximately the same time, the resulting tangential cogging force 320 is smaller than if their approaches were at different times. The cancellation effected as illustrated in FIG. 5A, between forces on leading and trailing transition areas may be referred to as a first level anti-cogging.

A further reduction in cogging forces, such as may be referred to as a second level anti-cogging may be realized because of distance 160 described above and the forces acting on additional magnets 190 and 195. As mentioned above, the distance 160 between first transition portion 125 of recess 105 and first transition portion 147 of adjacent recess 175 may be approximately nP/2+mP/4. In the exemplary dimensions of FIG. 3, m was selected to be 1. As a result magnet 190 is offset about ±90 electrical degrees from magnet 150 while magnet 195 has the same electrical offset with respect to magnet 180. As magnet 190 approaches first transition portion 147 and magnet 195 approaches third transition portion 157 they experience forces similar to those of magnets 150, 180 described above, offset by 90 electrical degrees.

Figure 5B:
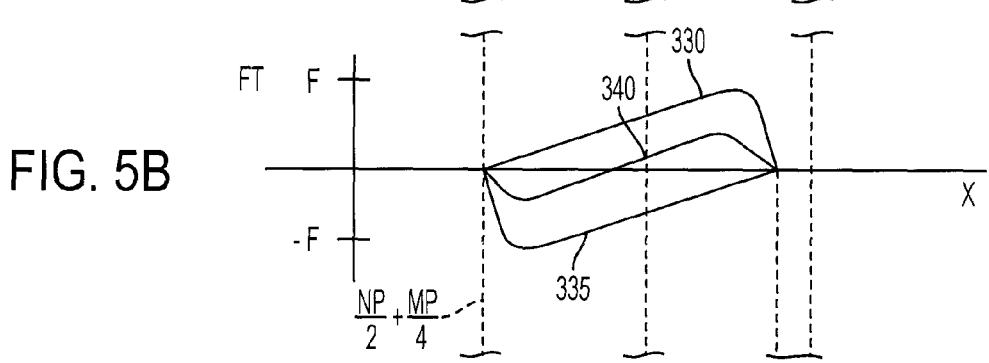

FIG. 5B shows a diagram of the tangential cogging force 330 on magnet 190, the tangential cogging force 335 on magnet 195 and a resulting tangential cogging force 340 from the sum of tangential forces 330 and 335 as a consequence of the exemplary dimensions of stator 100. Similar to magnets 150, 180, magnets 190 and 195 approach first transition portion and third transition portions 147 and 157, respectively at approximately the same time, resulting in a smaller tangential cogging force 340 than if their approaches were at different times.

Figure 5C:
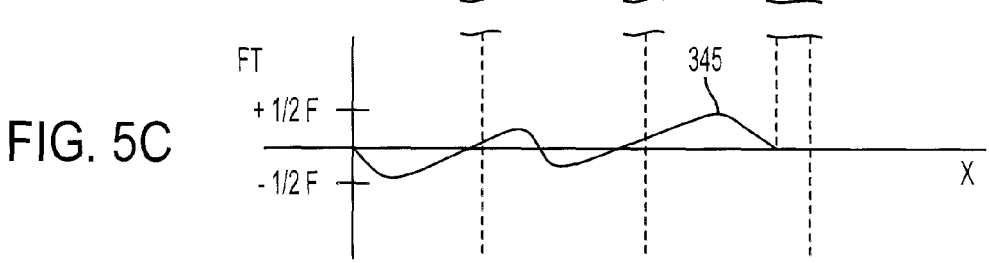

FIG. 5C shows an exemplary tangential cogging force 345 resulting from the combination of resulting forces 320 and 340 (e.g. the resultant two level anti-cogging. As noted before, and as can be seen from FIG. 5C, the distance within a recess and the distance between the first transition portions of adjacent recesses 160 of stator 100 results in further reducing tangential cogging forces.

Figure 6A:
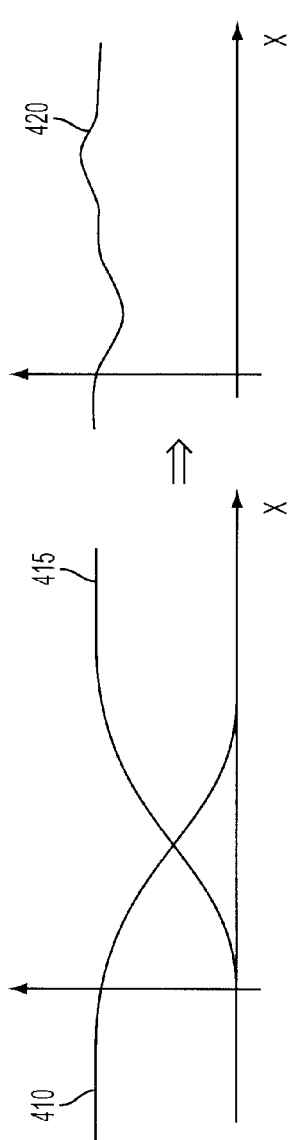
FIGS. 6A through 6C show diagrams of exemplary axial cogging forces affected by the disclosed embodiments.

The disclosed embodiments also provide for a reduction in cogging in an axial direction (Z-direction), that is, in a direction perpendicular to the plane of the rotor. FIG. 6A shows a diagram of the axial force 410 on magnet 150, the axial force 415 on magnet 180 and an axial cogging force 420 resulting from the sum of axial forces 410 and 415, as a consequence of the exemplary dimensions of stator 100. Similar to the embodiments above, the resulting axial cogging force 420 is reduced because magnets 150 and 180 approach and pass first and third transition portions 125 and 135, respectively at approximately the same time.

The cooperating regions (e.g. recesses 105, 175) are separated by distance 160, described above, so that the forces acting on magnets 190 and 195 may also operate to reduce axial cogging forces in combination with the anti-cogging forces developed by magnets 150 and 180. As mentioned above, the distance 160 between first transition portion 125 of recess 105 and first transition portion 147 of adjacent recess 175 may be approximately nP/2+mP/4. Thus, as magnet 190 approaches first transition portion 147 and magnet 195 approaches third transition portion 157 they experience axial forces similar to the axial forces of magnets 150, 180 described above, with an electrical offset.

Figure 6B:
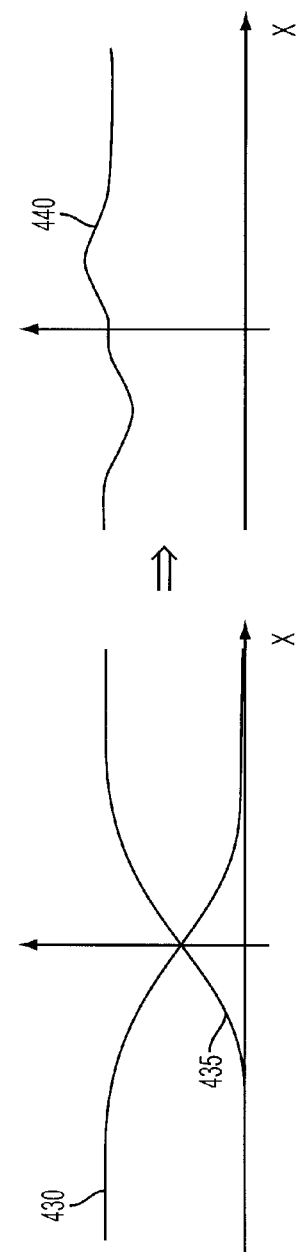
Figure 6C:
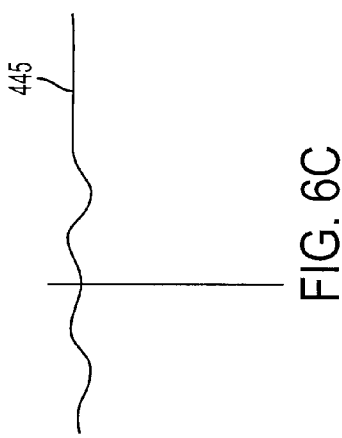

FIG. 6B shows a diagram of the axial cogging force 430 on magnet 190, the axial cogging force 435 on magnet 195 and a resulting axial cogging force 440 from the sum of axial forces 430 and 435 as a consequence of the exemplary dimensions of stator 100. Because magnets 190 and 195 approach first transition portion and third transition portions 147 and 157, respectively at approximately the same time, a reduced axial cogging force 440 may be obtained. The axial cogging force 445 resulting from the combination of axial forces 320 and 340 is shown in FIG. 6C.

As noted before, the profile of the respective cogging (and hence also the anti-cogging) forces may be varied with the shape and dimensions of the transition area surfaces. Thus the transition areas 115, 120, 127, 137 may have various shapes and dimensions as desired. In the exemplary embodiment shown in FIG. 3, and as noted before, the distance of each of the respective transition areas may be similar. For example, the distance of each transition area may be equal to or greater than P/2. In alternate embodiments, the distance as well as the shape of leading and trailing transition areas may be different, for example the trailing transition area (similar to area 120) having a longer distance (e.g. similar to distance 170) than the distance of the front transition area (similar to distance 165). Thus, the trailing transition may commence later relative to the moving magnets, than the leading transition, but may be longer than the leading transition. In the exemplary embodiments, the transition areas may be shaped such that one or more of the forces 310, 315, 330, 335, 410, 415, 430, 435 exhibit a more gradual transition or have a flatter profile.

Figure 7A:
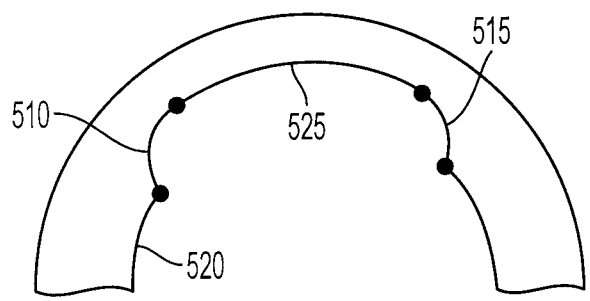
FIGS. 7A through 7E show exemplary transition areas of the disclosed embodiments.
Figure 7B:
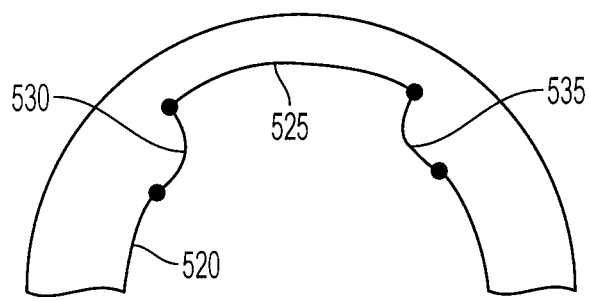
Figure 7C:
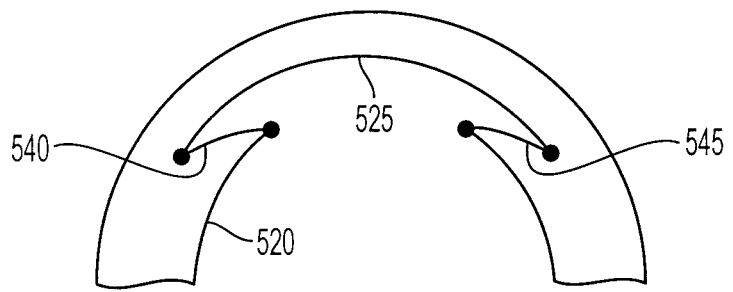
Figure 7D:
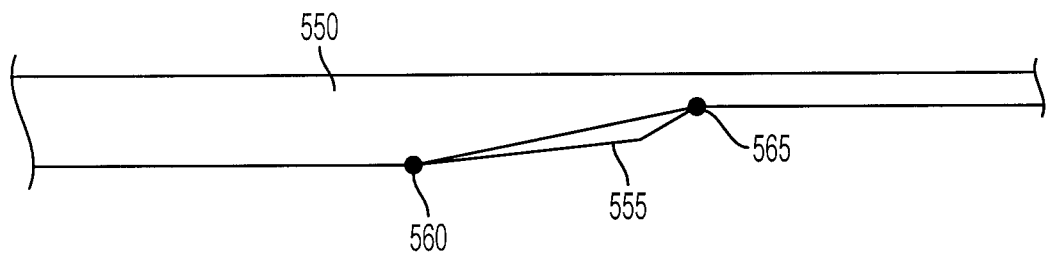
Figure 7E:
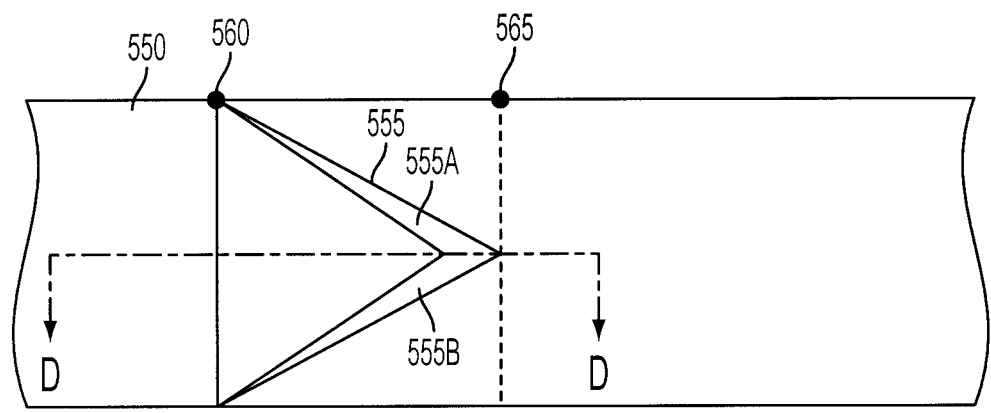

FIG. 3 shows exemplary transition areas 115, 120 as having an angular shape. Turning to FIG. 7A, exemplary transition areas 510, 515 may have a concave shape with respect to first surface 520 that curves inward from first surface 520 toward recess 525. As may be realized, the shapes of the surfaces may not be symmetric. FIG. 7B shows another embodiment where exemplary transition areas 530, 535 have convex shapes with respect to inner surface 520. FIG. 7C shows an embodiment where the transition areas 540, 545 recede from the first surface 520 and the recess 525. FIG. 7D shows a cross section and FIG. 7E shows a side view of a section 550 of a stator with an exemplary transition area that has a complex shape that includes a compound angle from transition portion 560 to transition portion 565. As may be realized, in the exemplary embodiment, the section 550 may be substantially commensurate with the Z overlap between permanent magnets and stator. In the exemplary embodiment shown in FIGS. 7D-7E, the compound angle transition surfaces 555A, 555B may be oriented to generate canceling cogging forces (e.g. providing desired anti-cogging effect) in the axial (Z) direction.

Other suitable configurations of the transition areas may also be utilized that include linear, non-linear, compound, and other shapes. It should be understood that the transition areas may not be symmetrical and may have different shapes and dimensions. In the disclosed embodiments, the transition areas may include various materials and, for example, may have portions made of materials different from those of other portions of the stator. In some embodiments, the materials for the transition areas may be selected to achieve a variable reluctance.

Figure 8:
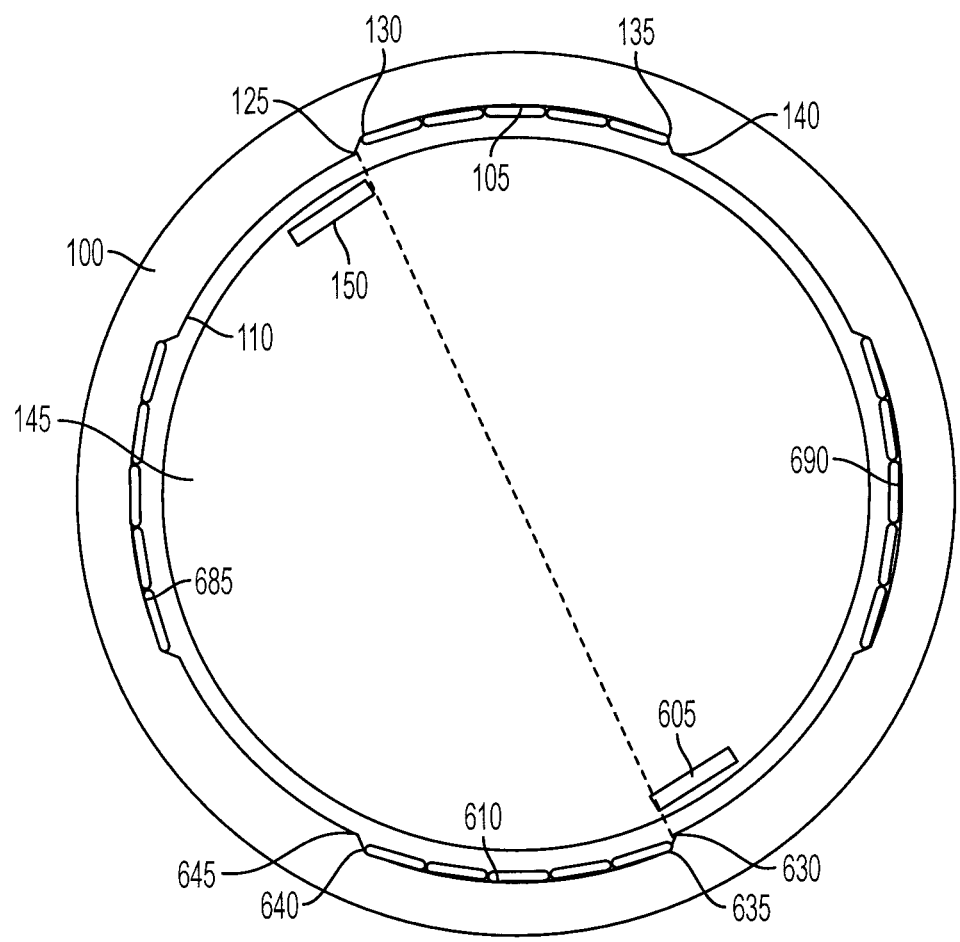
FIG. 8 shows an exemplary embodiment that provides a reduction of radial cogging forces.

The exemplary embodiments may also provide for a reduction of radial cogging forces, that is cogging forces parallel to the gap between the stators 100, 200 and the rotor 145 or platen 245, respectively. FIG. 8 shows a diagram of stator 100 of FIG. 3, including magnet 150, recess 105, and first 125, second 130, third 135, and fourth 140 transition portions. A magnet 605, diametrically opposed to magnet 105, may be one of the magnets shown in FIG. 3 or may be another magnet. Other elements of FIG. 3 are not shown for clarity. Stator 100 is shown having at least two recesses 105, 610 along first surface 110. Recess 610 may be recess 175 (FIG. 3) or may be another recess. Recess 610 includes first 630, second 635, third 640, and fourth 645 transition portions. At least one method of reducing radial cogging forces includes positioning the recesses 105, 610 along first surface 110 of the stator 100 so that diametrically opposed magnets 105, 605 on rotor 100 approach the respective first, second, third, and fourth transition portions at substantially the same time.

Figure 9A:
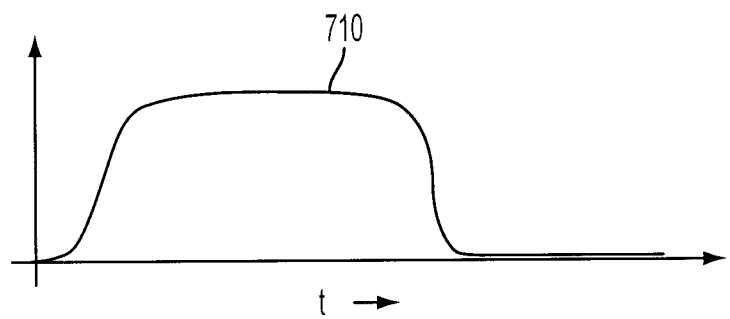
FIGS. 9A and 9B show exemplary radial cogging forces provided by the disclosed embodiments.
Figure 9B:
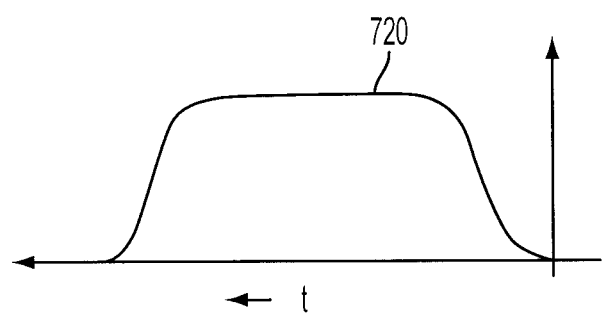

FIG. 9A shows the radial force 710 on rotor 145 as magnet 150 traverses first 125 and second 130 transition portions and FIG. 9B shows the radial force 720 on rotor 145 as magnet 605 traverses first 630 and second 635 transition portions. The forces 710, 720 essentially oppose each other and thus will tend to cancel each other as long as the rotor is maintained at the centered position.

Referring again to FIG. 8, as few as two winding sets 685, 690 may be used to drive the disclosed embodiments. Winding sets 685, 690 may include one or more windings. It should be understood that the winding sets used for the aspects of the disclosed embodiments may include one or more windings located in one or more of the recesses and may include any type of windings suitable for use in the disclosed embodiments. The disclosed embodiments may include segmented windings, for example, winding sets divided into one or more sub winding sets distributed in selected recesses of the stators. Each sub winding set may include one or more windings and may be driven to produce motor forces according to the disclosed embodiments. In one or more embodiments, the winding sets may be arranged as three phase winding sets, however, any suitable winding set arrangement may be used.

Figure 10:
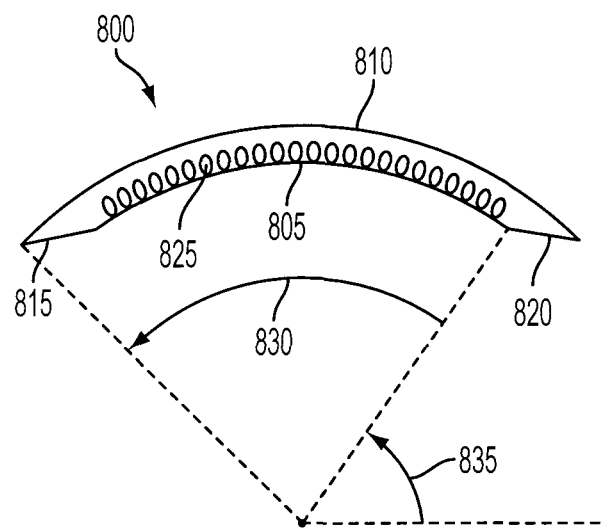
FIGS. 10 and 11 show diagrams of other exemplary elements for reducing cogging according to the disclosed embodiments.
Figure 11:
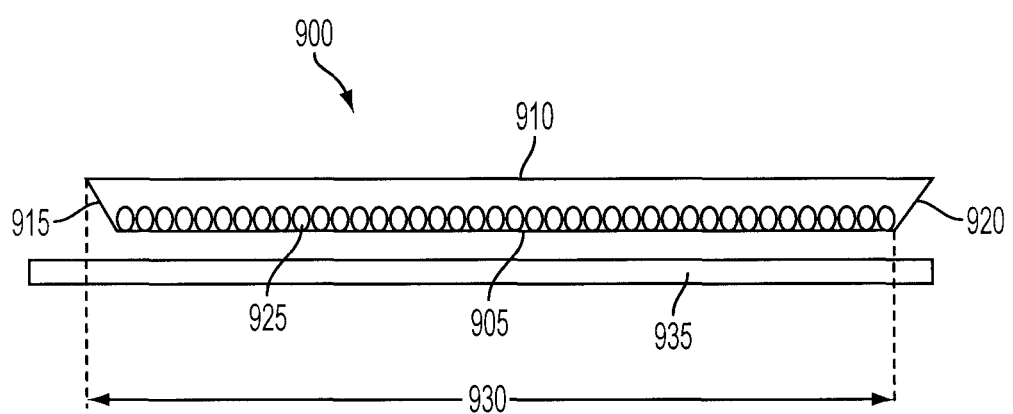

FIGS. 10 and 11 show schematic diagrams of other exemplary elements 800, 900 configured to reduce cogging according to the disclosed embodiments. The elements 800, 900 may be constructed of ferromagnetic material.

Elements 800, 900 may be used in rotary and linear applications, respectively. The geometry of the elements 800, 900 is arranged such that the superposition of the cogging forces caused by components of the elements result in a minimal overall cogging disturbance along the propulsion and gap directions. For example, cogging due to the stator winding teeth may be reduced by selection of the winding slot pitch, while cogging due to discontinuity of the stator may be reduced by choosing appropriate shapes and sizes of the transition areas.

Figure 12:
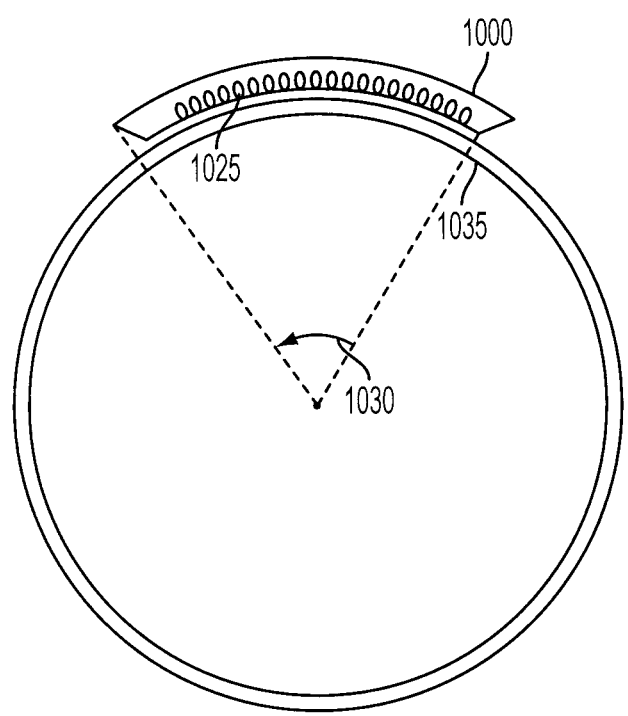
FIGS. 12 through 14 show different configurations of the exemplary elements of FIGS. 10 and 11.

The components of the element 800 in FIG. 10 include an inner arc-segment 805, an outer arc-segment 810, first and second transition zones 815, 820, a sequence of coil slots 825, and a span angle 830. The inner arc-segment 805 may be arranged to allow for interaction with a permanent magnet rotor, for example, 1035 (FIG. 12). The coil slots 825 may enclose a winding set, arranged for example as a three phase winding set. The winding set may be driven using a sinusoidal commutation scheme. The span angle 830 may be arranged such that angle 830=n (P/2), where n is any integer and P is the pitch between two magnets of the rotor with the same polarity.

The element 900 in FIG. 11 includes an inner segment 905, an outer segment 910, first and second transition zones 915, 920, a sequence of coil slots 925, and a span distance 930. The inner segment 905 may be arranged to allow for interaction with a permanent magnet platen 935. The coil slots 925 may enclose a winding set, arranged for example as a three phase winding set. The winding set may be driven using a sinusoidal commutation scheme. The span distance 930 may be arranged such that angle 930=n (P/2), where n is any integer, and P is the pitch between two magnets of the platen with the same polarity.

For both FIGS. 10 and 11 the coil slots 825, 925 may have a fractional slot pitch in applications using an odd number of elements 800, 900, or an integer slot pitch in applications using an even number of elements 800, 900. Thus, cogging due to the stator winding teeth may be reduced or essentially eliminated by selection of the slot pitch. It should be understood that any number of elements 800, 900 may be used.

Figure 13:
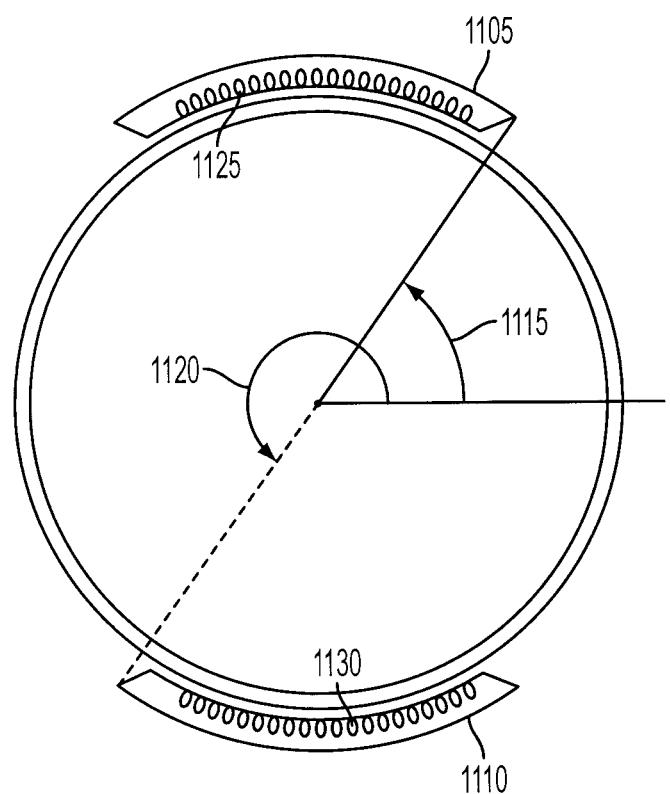

One exemplary embodiment shown in FIG. 12 may utilize a single 1000. The coil slots 1025 in this embodiment have a fractional slot pitch so that the cogging forces generated by the coil slots 1025 substantially cancel each other by destructive interference. FIG. 13 shows an exemplary embodiment having two elements 1105, 1110 configured to reduce cogging. This embodiment may utilize various techniques to minimize cogging. For example, 1105 and 1110 may be substantially identical and positioned so that reference angles 1115 and 1120 are 90 electrical degrees apart. As another example, 1105 and 1110 may be positioned so that reference angles 1115 and 1120 may be 180 mechanical degrees apart and coils slots 1125 and 1130 align with a 360 degree imaginary fractional slot pitch. In this manner coil slots 1125, 1130 are not identical.

Figure 14:
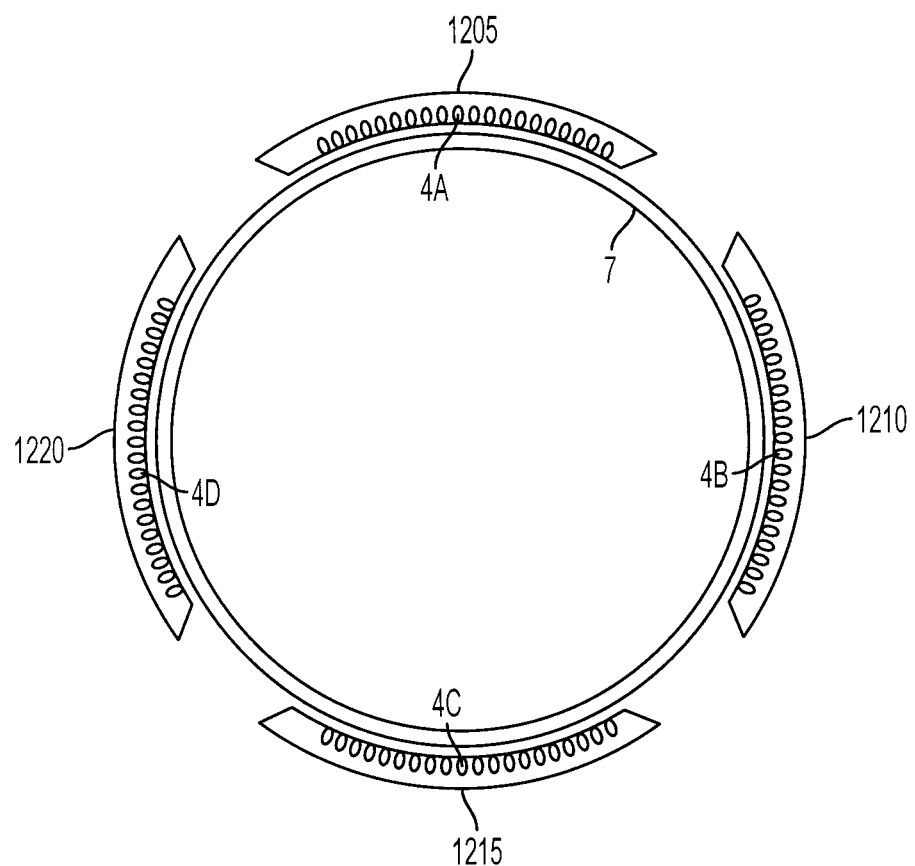

FIG. 14 shows an exemplary embodiment using four elements 1205, 1210, 1215, 1220 configured to reduce cogging. In one or more embodiments the elements may be identical and may be positioned 90 mechanical and electrical degrees apart. In other embodiments, elements 1205, 1210, 1215, 1220 may be arranged 90 mechanical degrees apart with corresponding coil slots 1225, 1230, 1235, 1240, respectively, aligned with an imaginary 360 degree fractional slot pitch. In some embodiments only a subset of the coil slots may be populated with coils because only the passive interaction between the rotor or platen magnets and the elements configured to reduce cogging are considered.

Figure 15:
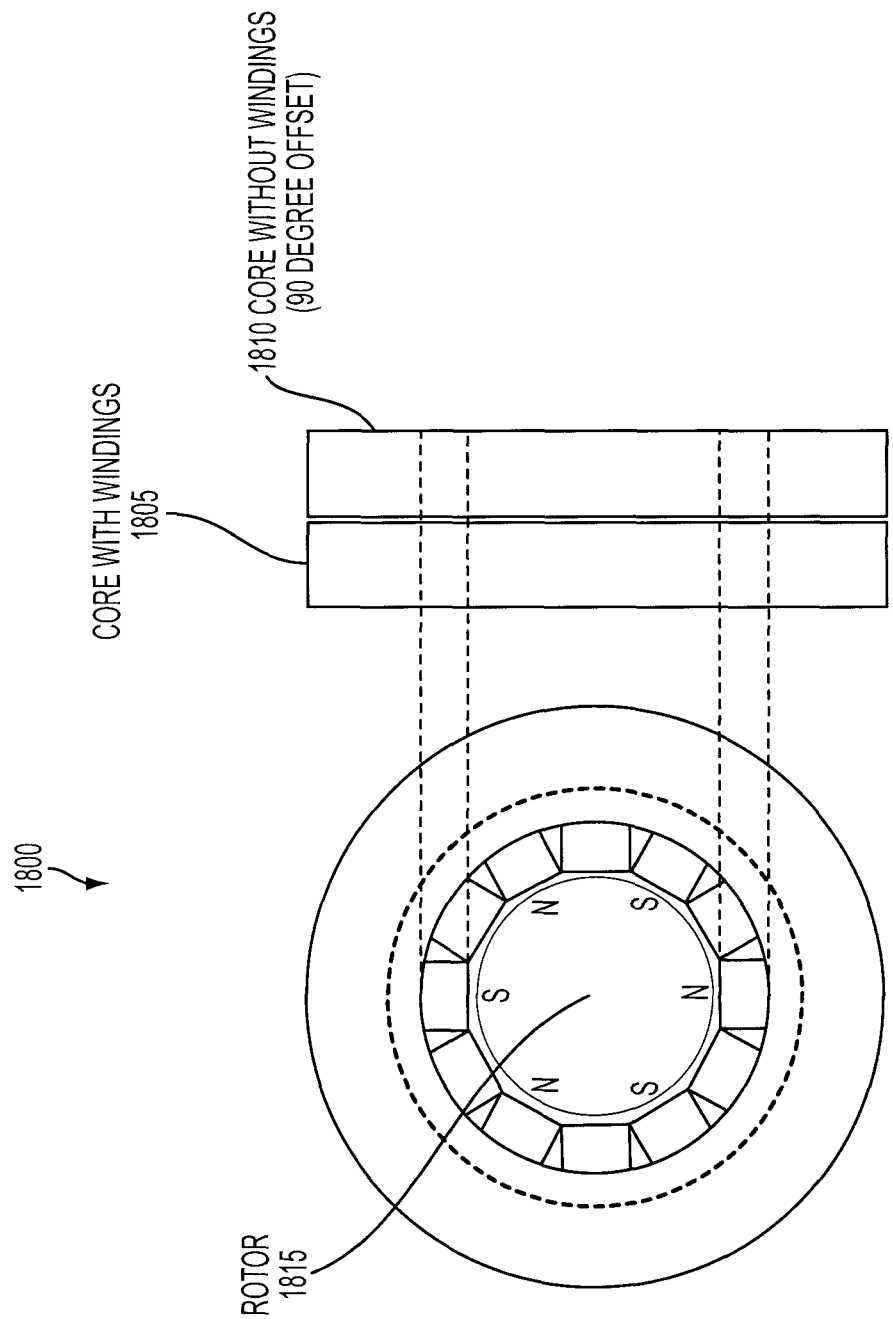
FIG. 15 shows a motor having at least two cores.

FIG. 15 shows a motor 1800 having a rotor 1815 and at least two cores, where at least a first core 1805 has windings and at least a second core 1810 has no windings. Core 1810 is offset from core 1805 by 90 degrees thus providing another embodiment of a mechanism configured to reduce cogging.

U.S. patent application Ser. No. 11/769,651, filed on 27 Jun. 2007, incorporated by reference, demonstrates that it is possible to obtain the functionality of a self-bearing motor with a reduced number of winding sets. U.S. patent application Ser. No. 11/769,688, filed on 27 Jun. 2007, incorporated by reference, describes exemplary commutation schemes for decoupling the radial and tangential forces in each winding set. As a result, simpler winding implementations may be utilized to produce arbitrary rotor torque and centering forces by independently controlling, for example, as few as two of the motors winding sets. The presently disclosed embodiments may be used to provide reduced cogging disturbances along a number of axes, and provide centering forces for the embodiments described in the above mentioned U.S. patent application Ser. Nos. 11/769,651 and 11/769,688.

In one or more of the disclosed embodiments, the elements configured to reduce cogging may include one or more of a ferromagnetic material, a number of electrically insulated ferromagnetic layers, or a metal powder in their construction.

Figure 16:
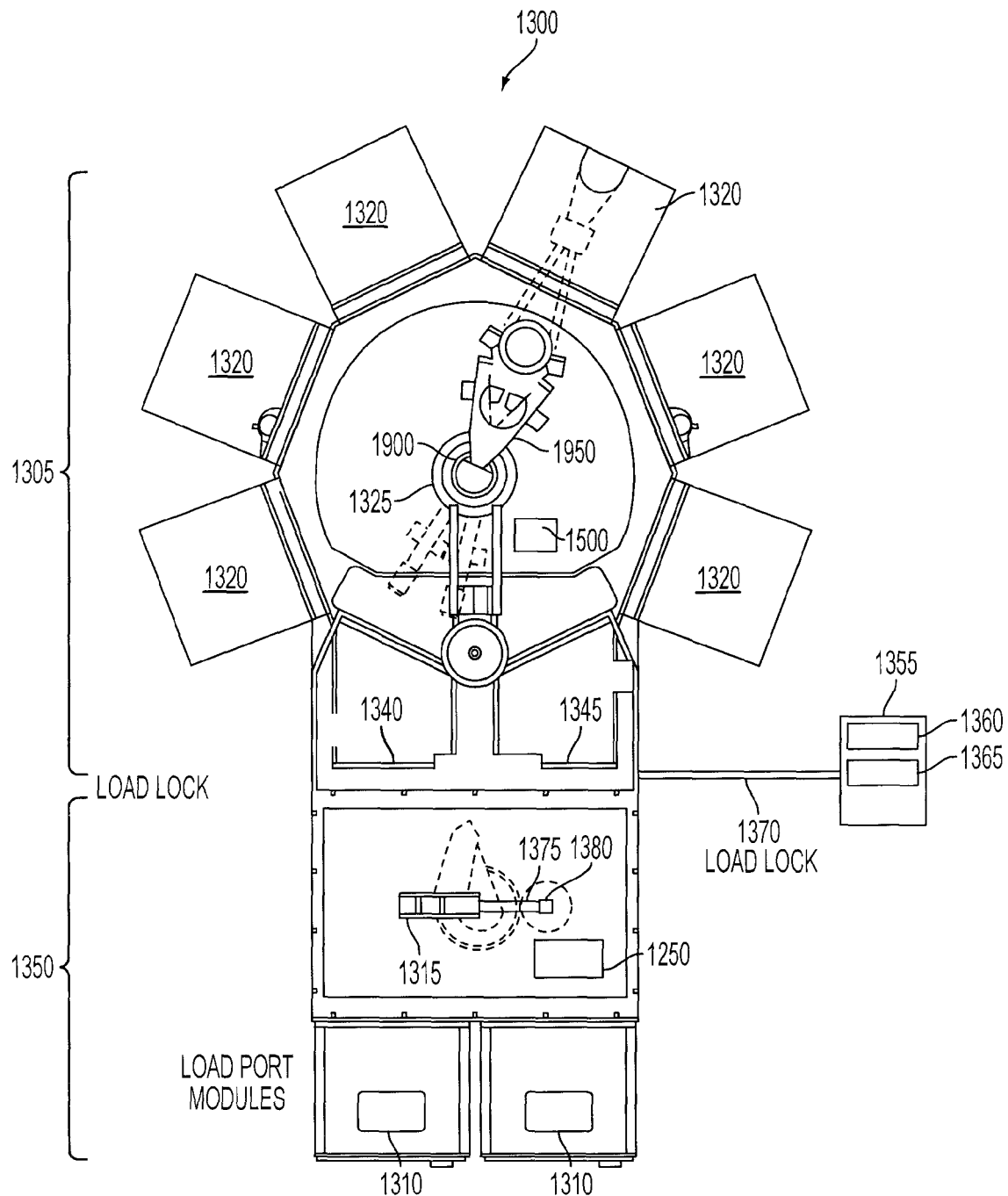
FIG. 16 is a schematic top plan view of a substrate apparatus in which the disclosed embodiments may be practiced.

FIG. 16 shows a top view of an exemplary substrate processing apparatus 1300 incorporating features of the disclosed embodiments. Substrate processing apparatus 1300 generally has an atmospheric section 1350, which is open to the atmosphere, and an adjoining vacuum section 1305, which is equipped to function as a vacuum chamber. Atmospheric section 1350 may have one or more substrate holding cassettes 1310, and an atmospheric substrate transport apparatus 1315. Vacuum section 1305 may have one or more processing modules 1320, and a vacuum substrate transport apparatus 1325. The embodiment shown in FIG. 13 may have load locks 1340, 1345 for allowing substrates to pass between atmospheric section 1350 and vacuum section 1305 without violating the integrity of any vacuum that may be present in vacuum section 1305.

Substrate processing apparatus 1300 also includes a controller 1355 that controls the operation of substrate processing apparatus 1300. Controller 1355 may include a processor 1360 and a memory 1365. Controller 1355 may be connected to substrate processing system 1300 through link 1370. For purposes of the disclosed embodiments a substrate may be for example, a semiconductor wafer (e.g. a 200 mm or 300 mm wafer), a flat panel display substrate, any other type of substrate suitable for processing by substrate processing apparatus 1300, a blank substrate, or a article having characteristics similar to a substrate, such as certain dimensions or a particular mass.

Atmospheric substrate transport apparatus 1315 may include one or more motors, for example, 1375, 1380 with elements configured to reduce cogging according to the disclosed embodiments. Motors 1375, 1380 may advantageously utilize one or more exemplary elements similar to those disclosed herein, for example, stators 100, 200, 550, 625 or elements 800, 900 in order to minimize cogging disturbances along a number of directions. The directions may include, for example, tangential, axial and gap directions.

Similarly, vacuum substrate transport apparatus 1325 may include one or more motors, for example, 1900, 1950 that may also include elements configured to reduce cogging according to the disclosed embodiments. Motors 1900, 1950 may utilize one or more elements, for example, stators 100, 200, 550, 625 or elements 800, 900. The one or more elements may operate to minimize cogging disturbances along a number of directions, for example, tangential, axial and gap directions.

Thus, the one or more elements, while producing a desired amount of axial and tilt stiffness, operate to minimize cogging disturbances along a number of axes and provide for more exact positioning of substrates by the substrate processing apparatus.

The presently disclosed embodiments describe various elements arranged to minimize cogging disturbances along propulsion, gap, and axial directions. The elements configured to minimize cogging include components arranged such that the superposition of the cogging forces caused by each component results in a minimal overal cogging disturbance along the propulsion, gap, and axial directions. The one or more elements also produce a desired amount of force across the air gap, including centering forces for rotary motor applications and locating or guidance forces for linear motor applications. At least some of the disclosed embodiments utilize the various elements in such a way that the superposition of the cogging forces caused by each element component results in a minimal overal cogging disturbance along the propulsion, gap, and axial directions.

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

What is claimed is:

1. A motor comprising:
   a stator including a surface; and
   a rotor equipped to be movable in at least a first direction relative to the stator, the rotor operably interfacing the stator so that a motor force is generated in a first direction, the rotor including permanent magnets,
   the stator comprising a plurality of elements disposed in the surface and configured to interface with the permanent magnets such that spacing of the permanent magnets and at least one element is configured such that leading edges of individual magnets of a pair of the permanent magnets approach a first transition between the surface and the one element and a second transition between the one element and the surface substantially simultaneously to generate anti-cogging forces on the rotor in at least the first direction and a second direction at an angle to the first direction,
   wherein the first and second transitions each comprise a first transition portion located a first distance from a radial center of the rotor and a second transition portion located a second distance from the radial center of the rotor, the first distance being different from the second distance,
   wherein a third distance between the first transition portion of the first transition and the second transition portion of the second transition is substantially a pitch of permanent magnets of the same polarity divided by 2, and
   wherein a pitch of adjacent elements is an integer multiple of the pitch of permanent magnets of the same polarity.

2. The motor of claim 1, comprising a synchronous brushless motor.

3. The motor of claim 1, wherein the at least one element is configured to generate anti-cogging forces on the rotor in at least a third direction at an angle to the first and second directions.

4. The motor of claim 1, wherein the at least one element comprises:
   at least a first recess extending inward from an inner surface of the stator; and
   at least two transition areas extending from the inner surface to the first recess,
   wherein a distance between the at least two transition areas is approximately nP/2 where n is any integer and P is the pitch between magnets of the same polarity interfacing with the stator.

5. The motor of claim 4, wherein the at least one element includes at least a second recess extending inward from an inner surface of the stator, wherein a distance between the first and second recesses is approximately nP/2 +mP/4, where n is any integer and m is an odd number.

6. The motor of claim 4, wherein at least one of the transition areas is angled with respect to the inner surface.

7. The motor of claim 4, wherein at least one of the transition areas has a surface concave with respect to the inner surface.

8. The motor of claim 4, wherein at least one of the transition areas has a surface convex with respect to the inner surface.

9. The motor of claim 4, wherein at least one of the transition areas recedes from the inner surface and the first recess.

10. The motor of claim 4, wherein at least one of the transition areas defines a compound angle between the inner surface and the first recess.

* * * * *